United States Patent
Beaver, III et al.

(10) Patent No.: US 12,118,598 B2
(45) Date of Patent: Oct. 15, 2024

(54) GENERATING AND USING TOKENS TO REQUEST SERVICES AND ACCESS TO A PRODUCT COLLABORATION PLATFORM

(71) Applicant: ZAZZLE INC., Redwood City, CA (US)

(72) Inventors: Robert I. Beaver, III, San Francisco, CA (US); Leslie Young Harvill, Olympia, WA (US)

(73) Assignee: ZAZZLE INC., Menlo Park, CA (US)

( * ) Notice: Subject to any disclaimer, the term of this patent is extended or adjusted under 35 U.S.C. 154(b) by 471 days.

(21) Appl. No.: 17/217,870

(22) Filed: Mar. 30, 2021

(65) Prior Publication Data

US 2022/0318874 A1 Oct. 6, 2022

(51) Int. Cl.
*G06Q 30/00* (2023.01)
*G06F 16/955* (2019.01)
(Continued)

(52) U.S. Cl.
CPC ..... *G06Q 30/0621* (2013.01); *G06F 16/9554* (2019.01); *G06F 16/9558* (2019.01); *G06K 7/1417* (2013.01); *G06Q 50/01* (2013.01)

(58) Field of Classification Search
CPC ............... G06Q 30/0621; G06Q 50/01; G06F 16/9558; G06F 16/9554; G06K 7/1417
(Continued)

(56) References Cited

U.S. PATENT DOCUMENTS

| | | |
|---|---|---|
| 5,897,622 A | 4/1999 | Blinn |
| 5,999,914 A | 12/1999 | Blinn |

(Continued)

FOREIGN PATENT DOCUMENTS

| | | |
|---|---|---|
| EP | 1 365 358 A2 | 11/2003 |
| WO | WO 2009/094724 A1 | 8/2009 |
| WO | WO 2013/033643 A1 | 3/2013 |

OTHER PUBLICATIONS

U.S. Appl. No. 13/601,931, filed Aug. 31, 2012, Office Action, Dec. 9, 2013.
(Continued)

*Primary Examiner* — Anand Loharikar
(74) *Attorney, Agent, or Firm* — Patterson & Sheridan LLP.; Malgorzata A. Kulczycka

(57) ABSTRACT

In some embodiments, a computer-implemented method comprises: receiving, by a service computer, a request for a service available from the service computer; wherein the request comprises a hyperlink associated with the service and an indication of a product to which the service pertains; wherein the request is received from a user computer upon scanning a token shown on the product, translating the token to the hyperlink, and transmitting the hyperlink and the indication of the product from the user computer to the service computer; in response to receiving the request: determining customization options for the service; and causing displaying, on the user computer, a graphical user interface allowing selecting any of the customization options; in response to receiving, from the user computer, input for the customization options for the service, generating adjusted input by adjusting the input for the customization options and providing the service according to the adjusted input.

18 Claims, 9 Drawing Sheets

(51) Int. Cl.
  *G06K 7/14* (2006.01)
  *G06Q 30/0601* (2023.01)
  *G06Q 50/00* (2012.01)
(58) Field of Classification Search
  USPC .............................................. 705/26.1–27.2
  See application file for complete search history.

(56) References Cited

U.S. PATENT DOCUMENTS

| | | | |
|---|---|---|---|
| 6,058,373 A | 5/2000 | Blinn |
| 6,343,287 B1 | 1/2002 | Kumar |
| 6,542,515 B1 | 4/2003 | Kumar |
| 6,591,011 B1 | 7/2003 | Nielsen |
| 6,664,972 B2 | 12/2003 | Eichel et al. |
| 6,725,257 B1 | 4/2004 | Cansler et al. |
| 7,016,869 B1 | 3/2006 | Haeberli |
| 7,062,483 B2 | 6/2006 | Ferrari et al. |
| 7,107,226 B1 | 9/2006 | Cassidy |
| 7,117,293 B1 | 10/2006 | Graziano |
| 7,376,891 B2 | 5/2008 | Hitchock |
| 7,502,788 B2 | 3/2009 | Balasubramanian |
| 7,617,184 B2 | 11/2009 | Ferrari et al. |
| 7,702,645 B2 | 4/2010 | Khushraj |
| 7,730,053 B2 | 6/2010 | Sauermann |
| 7,734,731 B2 | 6/2010 | Ordille et al. |
| 7,761,397 B2 | 7/2010 | Huelsman et al. |
| 7,777,747 B1 | 8/2010 | Krenz |
| 7,831,589 B2 | 11/2010 | Balasubramanian |
| 7,856,434 B2 | 12/2010 | Gluzman Peregrine et al. |
| 7,865,523 B2 | 1/2011 | Caballero et al. |
| 7,885,956 B2 | 2/2011 | Danish et al. |
| 7,930,313 B1 | 4/2011 | Geva |
| 8,175,931 B2 | 5/2012 | Harvill |
| 8,190,486 B1 | 5/2012 | Ouimet |
| 8,290,822 B2 | 10/2012 | Gade et al. |
| 8,335,724 B2 | 12/2012 | Sipes et al. |
| 8,429,110 B2 | 4/2013 | Cai et al. |
| 8,458,050 B2 | 6/2013 | Bagley et al. |
| 8,495,072 B1 | 7/2013 | Kapoor |
| 8,495,163 B2 | 7/2013 | Ordille et al. |
| 8,566,714 B1 | 10/2013 | Stringer et al. |
| 8,700,492 B1 | 4/2014 | Scott |
| 8,873,829 B1 | 10/2014 | Trya |
| 2001/0034668 A1 | 10/2001 | Whitworth |
| 2002/0030689 A1 | 3/2002 | Eichel et al. |
| 2002/0073001 A1 | 6/2002 | Palmer et al. |
| 2002/0083039 A1 | 6/2002 | Farrari et al. |
| 2003/0038799 A1 | 2/2003 | Smith |
| 2003/0080978 A1 | 5/2003 | Navab et al. |
| 2003/0182402 A1 | 9/2003 | Goodman |
| 2004/0044785 A1 | 3/2004 | Bell et al. |
| 2004/0133081 A1 | 7/2004 | Teller et al. |
| 2004/0143644 A1 | 7/2004 | Berton |
| 2004/0212617 A1 | 10/2004 | Fitzmaurice |
| 2005/0071242 A1 | 3/2005 | Allen et al. |
| 2005/0131571 A1 | 6/2005 | Costin |
| 2005/0138078 A1 | 6/2005 | Christenson et al. |
| 2005/0164766 A1 | 7/2005 | Haim et al. |
| 2005/0234993 A1 | 10/2005 | Ordille et al. |
| 2005/0258234 A1 | 11/2005 | Silverbrook et al. |
| 2006/0004697 A1 | 1/2006 | Lipsky et al. |
| 2006/0038815 A1 | 2/2006 | Loberg |
| 2006/0041421 A1 | 2/2006 | Ta |
| 2006/0107203 A1 | 5/2006 | Schilling |
| 2006/0155612 A1 | 7/2006 | Haeberli |
| 2006/0197775 A1 | 9/2006 | Neal |
| 2007/0033568 A1 | 2/2007 | Barrieau et al. |
| 2007/0067179 A1 | 3/2007 | Kerr et al. |
| 2007/0094204 A1 | 4/2007 | Huelsman et al. |
| 2007/0098234 A1 | 5/2007 | Fiala |
| 2007/0112731 A1 | 5/2007 | Balasubramanian |
| 2007/0124215 A1 | 5/2007 | Simmons |
| 2007/0143082 A1 | 6/2007 | Degnan |
| 2007/0168336 A1 | 7/2007 | Ransil et al. |
| 2007/0174781 A1 | 7/2007 | Begin et al. |
| 2007/0203798 A1 | 8/2007 | Caballero et al. |
| 2007/0226066 A1 | 9/2007 | Brunner |
| 2007/0226155 A1 | 9/2007 | Yu et al. |
| 2008/0069451 A1 | 3/2008 | Ikeda |
| 2008/0091551 A1 | 4/2008 | Olheiser et al. |
| 2008/0162305 A1 | 7/2008 | Russo et al. |
| 2008/0244454 A1 | 10/2008 | Shibaike |
| 2008/0247674 A1 | 10/2008 | Walch |
| 2008/0285854 A1 | 11/2008 | Kotake et al. |
| 2009/0043673 A1 | 2/2009 | Caballero et al. |
| 2009/0043759 A1 | 2/2009 | Danish et al. |
| 2009/0089174 A1 | 4/2009 | Brunner |
| 2009/0108057 A1* | 4/2009 | Mu .................. H04M 1/72445 235/375 |
| 2009/0177551 A1 | 7/2009 | Cue et al. |
| 2009/0195538 A1 | 8/2009 | Ryu et al. |
| 2009/0271295 A1 | 10/2009 | Hodge |
| 2009/0282403 A1 | 11/2009 | Poole |
| 2009/0289955 A1 | 11/2009 | Douris et al. |
| 2009/0317010 A1 | 12/2009 | Gerhard et al. |
| 2009/0324100 A1 | 12/2009 | Kletter et al. |
| 2010/0036753 A1 | 2/2010 | Harvill et al. |
| 2010/0066731 A1 | 3/2010 | Vecore et al. |
| 2010/0066750 A1 | 3/2010 | Yu et al. |
| 2010/0092079 A1 | 4/2010 | Aller |
| 2010/0100834 A1 | 4/2010 | Maconald |
| 2010/0114874 A1 | 5/2010 | Hansson |
| 2010/0145492 A1 | 6/2010 | Russell |
| 2010/0185529 A1 | 7/2010 | Chestnut et al. |
| 2010/0189316 A1 | 7/2010 | Walch |
| 2010/0238166 A1 | 9/2010 | Tamstorf et al. |
| 2010/0287511 A1 | 11/2010 | Meier et al. |
| 2010/0318442 A1 | 12/2010 | Paul et al. |
| 2010/0318476 A1 | 12/2010 | Huelsman et al. |
| 2011/0018895 A1 | 1/2011 | Buzyn et al. |
| 2011/0064388 A1 | 3/2011 | Brown |
| 2011/0098837 A1 | 4/2011 | Yucel et al. |
| 2011/0208618 A1 | 8/2011 | Christenson et al. |
| 2011/0225038 A1 | 9/2011 | Fontoura et al. |
| 2011/0280447 A1 | 11/2011 | Conwell |
| 2011/0305368 A1 | 12/2011 | Osako |
| 2012/0047045 A1 | 2/2012 | Gopikrishna et al. |
| 2012/0117072 A1 | 5/2012 | Gokturk et al. |
| 2012/0123674 A1 | 5/2012 | Perks et al. |
| 2012/0158535 A1 | 6/2012 | Barrieau et al. |
| 2012/0218300 A1 | 8/2012 | Hayakawa |
| 2012/0218468 A1 | 8/2012 | Tan et al. |
| 2012/0221428 A1 | 8/2012 | Harvill |
| 2012/0224743 A1 | 9/2012 | Rodriguez |
| 2013/0054651 A1 | 2/2013 | Shepherd |
| 2013/0060801 A1 | 3/2013 | Beaver, III |
| 2013/0117227 A1 | 5/2013 | Kruglick |
| 2013/0193204 A1 | 8/2013 | Kerscher |
| 2013/0304604 A1 | 11/2013 | Hoffman |
| 2014/0201187 A1 | 7/2014 | Larson |
| 2014/0215477 A1 | 7/2014 | Chen |
| 2014/0223575 A1 | 8/2014 | Nandi |
| 2015/0019445 A1 | 1/2015 | Glass |
| 2015/0025994 A1 | 1/2015 | Beaver, III et al. |
| 2015/0095345 A1 | 4/2015 | Arai |
| 2015/0227939 A1 | 8/2015 | Huang |
| 2018/0075636 A1 | 3/2018 | Harvill |
| 2019/0108292 A1* | 4/2019 | Bowen ........... G06Q 10/063118 |
| 2021/0118031 A1 | 4/2021 | Beaver, III |
| 2021/0192097 A1 | 6/2021 | Beaver |

OTHER PUBLICATIONS

U.S. Appl. No. 14/508,918, filed Oct. 7, 2014, Office Action, Sep. 9, 2015.
U.S. Appl. No. 14/508,918, filed Oct. 7, 2014, Notice of Allowance, Feb. 25, 2016.
U.S. Appl. No. 14/316,623, filed Jun. 26, 2014, Office Action, Feb. 9, 2015.
U.S. Appl. No. 14/316,623, filed Jun. 26, 2014, Notice of Allowance, Mar. 30, 2016.
U.S. Appl. No. 14/316,623, filed Jun. 26, 2014, Final Office Action, Jul. 23, 2015.

(56) References Cited

OTHER PUBLICATIONS

U.S. Appl. No. 13/601,931, filed Aug. 31, 2012, Notice of Allowance, May 30, 2014.
Harvill, U.S. Appl. No. 15/818,514, filed Nov. 20, 2017, Office Action, Jun. 14, 2018.
Harvill, U.S. Appl. No. 15/818,514, filed Nov. 20, 2017, Notice of Allowancem Aug. 29, 2018.
2013/0060801 Notice of Publication dated Mar. 7, 2013.
The International Searching Authority, "Search Report" in Application No. PCT/US2022/013436, dated Apr. 13, 2022, 11 pages.
Current Claims in application No. PCT/US2014/044459, dated Oct. 24, 2014, 10 pages.
Claims for PCT application PCT/US12/53535, dated Feb. 5, 2013, 5 pages.
Hirokazu Kato and Mark Billnghurst. "ARToolkit User Manual", Human Interface Technology Lab, University of Washington, dated 2000, 44 pages.
Evlioglu, S. Mass Customization in Footware Industry: Setting up a Web-Based Configurator. Politencico Di Milano. Dated Dec. 20, 2012.
European Patent Office, Office Action, in application No. 12181208.5 1238, dated Dec. 6, 2012, 7 pages.
International Searching Authority, "Search Report" in application No. PCT/US2014/044459, dated Oct. 24, 2014, 11 pages.
Daniel Wagner, Tobias Langlotz, and Dieter Schmalstieg, Robust and Unobtrusive Marker Tracking on Mobile Phones, Washington, DC, USA, Dated 2008, IEEE Computer Society, 4 pages.
Homayoun Bagherinia O Roberto Manduchi, Robust Real-Time Detection of Multi-Color Markers on a Cell Phone, J Real-Time Image Proc., Dated Jun. 3, 2011, 17 pages.
Current Claims in application No. PCT/US2020/053585, dated Dec. 2020, 5 pages.
International Searching Authority, "Search Report" in application No. PCT/US12/53535, dated Feb. 5, 2013, 12 pages.
Current Claims in application No. PCT/US12/53535, dated Feb. 2013, 5 pages.
Capterra Website, "Top Product Configurator Software Products", dated 2014, Reviews of the Best Systems, accessed online <http://www.capterra.com/product-configurator-software> on May 28, 2014, 15pgs.
"Product Configurator", IBM, available: <http://www.-01.ibm.com/software/commerce/products/products/product-configurator/>, retrieved Nov. 26, 20103.
"Product Configuration System", Oracle, available: <http://www.bigmachines.com/product_configuration_system.php>, retrieved Nov. 26, 2013.
"Knowledge-based configuration", Wikipedia, available: <http://en.wikipedia.org/wiki/Knowledge-based_configuration>, retrieved Nov. 26, 2013.
"IBM Sterling Configurator—Customize complex products, services and bundles", IBM Software, available: <http://www.-01.ibm.com/software/commerce/products/products/product-configurator/>, Nov. 26, 2013.

Current Claims in European application No. 12181208.5 1238, dated Dec. 2012, 4 pages.
Myownbike.de-individual singlespeed and fixie bikes. Dated Feb. 21, 2012, www.behance.net/gallery/3197765/myownbike-individual-singlespeed-fixie-bikes.
UXMWN:, "MyOwnBike.de", dated Sep. 11, 2012, www.Http://vimeo.com/49234243, retrieved on Oct. 14, 2014, 1 page.
The International Searching Authority, "Search Report" in application No. PCT/US2020/053585, dated Dec. 15, 2020, 13 pages.
Ryan A. Beasley, Semiautonomous Medical Image Segmentation Using Seeded Cellular Automation Plus Edge Detector, dated 2012, Article ID 914232, 9 pages.
Qin et al., "Product Configuration Flow From Obtaining Customer Requirement to Providing the Final Customized Product", Journal of Software, vol. 7, No. 2., dated 2012, 12 pages.
Paul L. Rosin, "Training Cellular Automata for Image Processing", SCIA 2005, LNCS 3540, dated 2005, 10 pages.
Pantida Patirupanusara, Marker-Based Augmented Reality Magic Book for Anatomical Education, dated May 26-27, 2012, Phuket, 3 pages.
Hirokazu Kato et al. Marker Tracking and HMD Calibration for a Videobased Augmented Reality Conferencing System, San Francisco, USA Dated Oct. 1999, 10 pages.
Nima Soltani, Mehmet Yilmax, "Using Augmented-Reality on Planar Surfaced for Previewing Decor Changes", Stanford University EE368 Class Project Spring, dated 2010, 5 pages.
W. Lee and W. Woo, "Real-time Color Correction for Marker-Based Augmented Reality Applications", International Workshop on Ubiquitous VR (IWUVR2009), dated 2009, 4 pages.
Martin Hirzer, "Marker Detection for Augmented Reality Applications", Graz University of Technology, Austria, Dated Oct. 27, 2008, 27 pages.
Mark Fiala, "Artag, A Fiducial Marker System Using Digital Techniques", In CVRP '05: Proceedings of the 2005 IEEE, dated 2005, 7 pages.
Jun Rekimoto, "Matrix: A Realtime Object Identication and Registration Method for Augmented Reality", Computer Human Interaction, Dated 1998, Proceedings, 3rd Asia Pacific, Jul. 15-17, 1998, 6 pages.
Jun Rekimoto and Yuji Ayatsuka, "CyberCode: Designing Augmented Reality Environments with Visual Tags", Proceedings of DARE 2000 on Designing, Dated Apr. 2000, 10 pages.
Johannes Kohler, Alain Pagani, and Didier Stricker, Detection and Identification Techniques for Markers Used in Computer Vision, VLUDS.2010.36, dated 2010, 9 pages.
ISR WO for PCT Application PCT/US12/53535, dated Feb. 5, 2013, 12 pages.
Pokemon AR Marker in Sep. 2001 (http://pokemasters.net/forums/showthread.php?t=24845) 17 pages.
Australian Office Action dated Apr. 17, 2024 for Application No. 2022247245.

* cited by examiner

GENERATING AND USING TOKENS TO REQUEST SERVICES AND ACCESS TO A PRODUCT COLLABORATION PLATFORM

CROSS REFERENCE TO RELATED APPLICATIONS

This application is related to U.S. patent application Ser. No. 17/193,512, filed Mar. 5, 2021; U.S. application Ser. No. 17/038,659, filed Sep. 30, 2020; U.S. Pat. No. 8,090,461, granted Jan. 3, 2012; U.S. Pat. No. 8,175,931, granted May 8, 2012; U.S. Pat. No. 8,856,160, granted Oct. 7, 2014; U.S. Pat. No. 9,355,421, granted on May 31, 2016; U.S. Pat. No. 9,400,997, granted Jul. 26, 2016; U.S. Pat. No. 10,176,617, granted Jan. 8, 2019; and US published patent application no. 2013/0060654, filed Aug. 29, 2012; the entire contents of each of which are hereby incorporated by reference for all purposes as if fully set forth herein.

FIELD OF THE DISCLOSURE

One technical field of the disclosure pertains to generating tokens that capture hyperlinks and product-identifications, and that provide means for accessing a product collaboration platform to facilitate sending messages to users, contacting users of the platform, and requesting additional information about products. Another technical field pertains to embedding tokens in digital and physical products and making the tokens available to users to allow the users to access a product collaboration platform to request services from the platform. Another technical field of the disclosure pertains to scanning token labels shown on digital and physical products and using the scanned data to facilitate automatic access to services offered by a product collaboration platform.

BACKGROUND

Over the years, computer-implemented, collaboration applications have become very popular. Early examples of the collaboration applications include tools for collaborative text editing, text messaging, and shared-calendar planning. Other collaboration applications offer shared spreadsheets, video conferencing, and picture sharing applications.

The recent innovations in the computer technologies have stimulated the development of collaboration platforms for designing digital and physical products using online services. A digital product is a product that can be designed digitally and delivered to customers as a digital item, while a physical product is a product that can be designed digitally but delivered to customers as a physical item.

Due to many recent technological advances, many products may be designed and customized online and using collaboration platforms. A collaboration platform may provide the functionalities for creating and ordering the customized products in a digital form, a physical form or both.

With the increasing popularity of digital media and ubiquity of online design services provided by collaboration platforms, there is a need for developing tools that would allow the users of the platforms to automatically request additional services from the platforms and to automatically join the user-communities supported by the platforms.

SUMMARY

The appended claims may serve as a summary of the disclosure.

DETAILED DESCRIPTION

Figure 1:
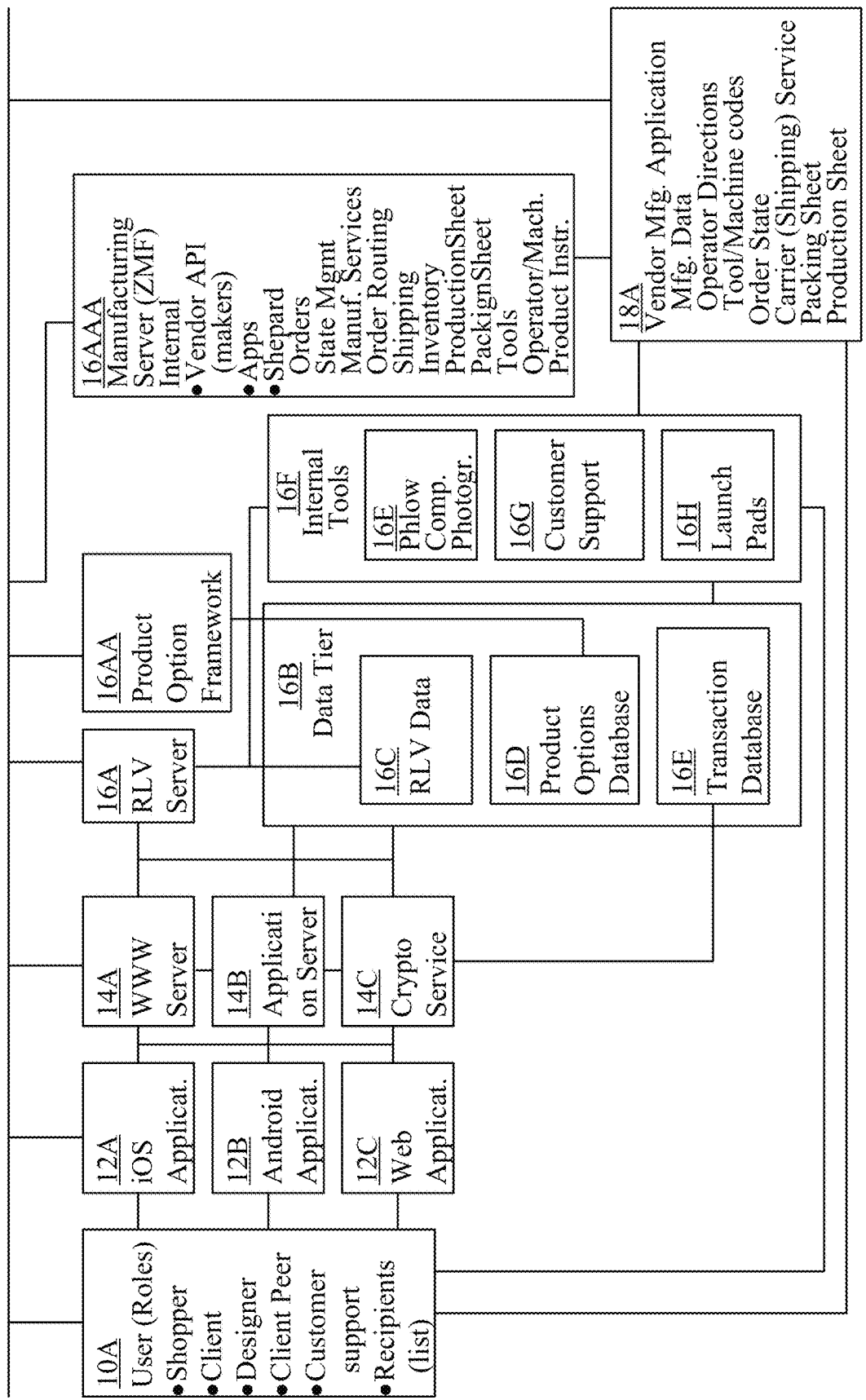
FIG. 1 is a block diagram showing an example environment for designing and manufacturing products.

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach. Embodiments are disclosed in sections according to the following outline:

1. GENERAL OVERVIEW
2. EXAMPLE COMPUTER ENVIRONMENTS
   2.1. USER DEVICES
   2.2. CLIENT APPLICATIONS
   2.3. FRONT END SERVERS
   2.4. CORE SERVICES
   2.5. EXAMPLE MANUFACTURING SYSTEM
   2.6. EXAMPLE MANUFACTURING PROCESS
   2.7. EXAMPLE PRODUCT COLLABORATION PLATFORM
3. DIFFERENCES BETWEEN TOKENS DESCRIBING PRODUCTS AND TOKENS USED TO REQUEST SERVICES AND ACCESS
   3.1. DIGITAL TOKENS DESCRIBING PRODUCTS
   3.2. TOKEN USED TO REQUEST SERVICES AND ACCESS
4. USING TOKENS TO REQUEST SERVICES AND ACCESS
   4.1. TOKENS
   4.2. GENERATING TOKENS FOR REQUESTING SERVICES AND ACCESS
   4.3. USING TOKENS TO REQUEST SERVICES AND ACCESS
      4.3.1. USING TOKENS TO REQUEST SENDING GIFTS TO OTHERS
      4.3.2. USING TOKENS TO REQUEST JOINING A COMMUNITY
   4.4. EXAMPLE FLOW
   4.5. TOKENS IN GREETING CARDS 4.6. TOKENS IN INVITATIONS
4.7. TOKENS IN GIFTS
4.8. TOKENS IN MEMORIALIZED CREATIONS
4.9. TOKENS IN BUSINESS CARDS
5. ROLE-BASED COLLABORATION PLATFORMS
   5.1. ROLE-BASED COLLABORATION
   5.2. EXAMPLE OF A ROLE-BASED COLLABORATION PLATFORM
   5.3. USER ROLES
   5.4. COLLABORATION DATA
   5.5. PRODUCT OPTIONS FRAMEWORK
   5.6. ATTRIBUTE ENGINES
   5.7. USER COMPUTERS
   5.8. COLLABORATION SERVER
6. IMPLEMENTATION MECHANISMS

1. General Overview

In some embodiments, a computer-implemented method, a computer system, or a computer program executes to facilitate and automate a process for using tokens to request services and access to a product collaboration platform. A product collaboration platform, also referred to as a service computer, is used to design and order products and to request various services. The product collaboration platform may be implemented in a computer server, a distributed computer system, a cloud-based system, and the like. The products may include digital products, i.e., the products designed and delivered digitally—such as digital gift cards, party invitations in digital forms, digital greeting cards, announcement in digital forms, and the like. The products may also include physical products, i.e., the products designed digitally but delivered as physical things—such as physical t-shirts, physical mugs, physical water bottles, physical picture frames, and the like.

In some embodiments, a computer-implemented method comprises receiving, by a service computer, a request for a service available from the service computer. The request may be received from a user computer. An example of the service computer may be a product collaboration platform configured to, for example, facilitate creating and customizing digital designs; ordering products manufactured based on the digital designs; providing functionalities for sending thank-you cards in response to receiving products; and the like. Details about the product collaboration platform and the services are described later.

The user computer may generate the request based on, at least in part, token information obtained by scanning a token label attached to, affixed to, or shown on a product. In the context of requesting services and access to a collaboration platform, tokens are equated with token digital data, while token labels are equated with labels used to encode the tokens.

A token label shown on a product is a visible representation of token digital data that may be used to, for example, request services and access to a product collaboration platform. The token label may also be understood as a visible voucher that can be exchanged for services offered by the product collaboration platform.

A token label may include a QR code (such as a Maxi Code, a PDF417 code, a Semacode), a bar code, a universal product code, an embedded signal code, or any other type of code, or tag, that may be affixed, attached, or printed as a label and shown on a physical product or that may be shown as a digital label on a digital product.

A token label shown on a digital product may be called a digital label, while a token label shown on a physical product may be called a physical label. Stating differently, one of the differences between a token digital label and a token physical label is that the token digital label is shown on a digital product, while the token physical label is shown on a physical product.

A product having a token physical label may be a physical product, such as a physical t-shirt, a physical mug, a physical water bottle, a physical picture frame, and the like. A product showing a token digital label may be a digital product, such as a digital gift card, a digital invitation, a digital greeting card, and the like. The token labels encode tokens, which in turn, encode, for example, hyperlinks and indications of the corresponding services and products.

A token label may be scanned using a digital scanning device to generate scanned data (i.e., token digital data). The scanned data may be provided to the user computer, which in turn may transmit the scanned data to the service computer. The scanning of the token label may be performed using, for example, a camera implemented in a user device such as a smartphone or a standalone scanning device that is capable of transmitting the scanned data to the user device.

Token digital data (i.e., a token) for a product may encode a hyperlink pointing to a location, at a data storage system, at which a plurality of key-value pairs describing a digital design of the product is stored. A plurality of key-value pairs for the digital design may capture characteristics, or attributes, of the digital design, such as a color, a size, a finish, a material, and the like. The key-value pairs may also capture attributions of users who collaborated with each other as they created the digital design of the product. The pairs may also include manufacturing instructions for manufacturing the product. The key-value pairs are described in detail later.

Hyperlinks included in tokens may be used to retrieve a plurality of key-value pairs and manufacturing instructions for manufacturing a product according to the key-value pairs for the digital design of the product. The same, or different, hyperlinks included in the tokens may be used to allow access to a product collaboration platform and request services from the platform.

Examples of services requested from a product collaboration platform may include requests for services such as sending thank-you cards, joining a community of designers and customers that use the platform, reordering the products, and the like. Furthermore, the services may include creating and designing party invitations, greeting cards, gifts, and the like. The services may also include scheduling and planning events that occur periodically, such as birthdays, anniversaries, due dates, and the like. The services may further include planning events such as engagement parties, weddings, baby-shower parties, welcome-home parties, graduation parties, religious-event parties, and the like. Moreover, the services may include sharing pictures and comments with friends, families, acquaintances, and coworkers.

In some embodiments, the request, received by the service computer from the user computer, for the service may include a hyperlink associated with one or more services and an indication of a product to which the services pertain. The request may be received from the user computer after a user of the user computer scanned a token label shown on the product, and after the content of the token label was decoded into token data or translated into the hyperlink.

Once the request is received from the user computer, the service computer may parse the request, and identify a hyperlink included in the request. Then the service computer may use the hyperlink to generate graphical representation data of a webpage identified by the hyperlink and transmit the graphical representation data to the user computer to cause the user computer to launch a browser, display the browser on a display device of the user computer, and use the graphical representation data to generate and display the corresponding webpage. Launching the browser on the user computer may also include generating a graphical representation of the requested service(s) and goods associated with the product that is indicated in the request received by the service computer from the user computer.

In some embodiments, in response to receiving the request for the service, the service computer determines one or more customization options for the requested service and causes displaying, on the user computer, a graphical user interface (GUI) to allow a user of the user computer to provide input to any of the one or more customization options. Examples of the options depend on the type of service that has been requested. For example, if the service pertains to sending a thank-you card, then the options may include options for modifying a text of the thank-you card, adding some pictures to the thank-you card, and the like.

In response to receiving, from the user computer, input for at least one of the customization options for the service, the service computer may provide the service according to the input provided for the customization options.

Providing the service according to the customization options may include generating, for example, a thank-you card and sending the thank-you card to the card's addressee. For example: suppose that a sender sent a gift card, either digital or physical, to a recipient. Upon receiving the gift card, the recipient may scan, using his smartphone, a QR code shown on the card. Once the scanning is completed, a browser may be launched on the recipient's smartphone. The browser may generate, for example, a GUI depicting a webpage powered by a product collaboration platform and allowing creating a thank-you card. The GUI may display one or more customization options that may be used to, for example, modify a text of the thank-you card, add some pictures to the thank-you card, and the like. Once the recipient finishes customizing the thank-you card, the recipient may request the platform to send the thank-you card to the card's addressee, i.e., the sender of the gift card.

Providing the service may also include facilitating access to a social media account according to the customization options selected and provided by the user of the user computer.

2. Example Computer Environments

In some embodiments, an approach for using tokens to request services and access is implemented in a product collaboration platform. The platform allows users, designers, customers, and support engineers, to, for example, design and create digital designs of products. An example computer environment for the process of creating digital designs, manufacturing products, generating tokens, and attaching tokens to the final products is described later in FIG. 1.

A digital design for a product may be captured in, for example product description data for the product. The product description data, and other data related to the product or to the platform may be encoded in a token. The token, including the product description data, may be stored in a storage system at a particular location. The location may be identified using a hyperlink indicating the particular location in the storage system.

A hyperlink to the particular location may be created and transmitted from the collaboration platform to a manufacturing server to cause the manufacturing server to generate a final product based on the digital design.

A manufacturing server may encode the token information in a token label and attach the label to a product. Once the product is delivered to a recipient, the recipient may scan the token label shown, or depicted, on the product, and use the scanned token information to request services and access to the product collaboration platform.

A product may be a digital product, such as a digital gift card, or may be a physical product, such as a physical t-shirt. If the product is a physical product, then the token may be encoded in a physical label and the physical label may be attached to the product or printed on the shipping slip that accompanies the shipped final product. If the product is a digital product, then the token may be encoded in a digital label and the digital label may be included in an image depicting the digital product.

The approach for generating and using tokens to request services and access a product collaboration platform is implemented assuming that the tokens are already attached, affixed, or otherwise shown on products.

FIG. 1 is a block diagram showing an example environment for designing and manufacturing products. FIG. 1, the other drawing figures, and all of the description and claims in this disclosure are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In FIG. 1, users 10 are individuals who create and design digital designs of products; clients 12 correspond to software applications configured to facilitate communications between users 10 and front end servers 14; core services 16 correspond to software applications and tools configured to facilitate creating and designing of the digital designs and generating manufacturing instructions for manufacturing final products based on the digital designs; and manufacturing 18 corresponds to manufacturing servers and applications configured to manufacture, or cause manufacturing, the final products, generate tokens that allow recipients of the final products to request services and access to core services 16, and attach the tokens to, or depict the token on, the final products.

2.1. User Devices

FIG. 1 depicts several examples of users 10. Each of users 10 may use its own, or shared, computer device. Examples of user devices are described later in FIG. 2 (see devices 140A-G).

In some embodiments, examples of users 10 are determined based on the roles that may be assigned to the users. Examples 10A of roles may include a shopper, a client, a designer, a client peer, a customer support engineer, a recipient, and the like. Examples of user roles are described in detail in FIG. 8.

2.2. Client Applications

Clients 12 in FIG. 1 refer to client applications that are implemented in client servers and that are configured to support requests received from users 10A. Non-limiting examples of clients 12 may include iOS applications 12A, Android applications 12B, Web applications 12C, and the like.

2.3. Front End Servers

Front end servers 14 refer to computer-based servers that are configured to process requests received from clients 12 and from core services 16. Examples of front end servers 14 include one or more WWW servers 14A, one or more application servers 14B, one or more cryptographic servers 14C. Cryptographic servers 14C may be configured to provide cryptographic services for encrypting/decrypting, transmitting, or otherwise communicate data between the entities depicted in FIG. 1.

2.4. Core Services

Core services 16 in FIG. 1 refer to servers and services implemented in a role-based collaboration platform configured to provide functionalities for creating and designing digital designs, handle collaboration requests, and facilitate the customization requests received from users 10. The role-based collaboration platform is described in detail in FIG. 2.

In some embodiments, a customization process performed by a user, of users 10, and intended to generate a digital design of a customized product is captured in so-called product description data, which then may be translated into a manufacturing description comprising product and manufacturing instructions.

The product and manufacturing instructions may include digital design specifications, data, and code needed to manufacture a custom product. That may include instructions for generating, for example, a 3D geometry for digital final products. This may also include generating instructions for generating 2D and/or 3D patterns that may be used to cut, cast, or form physical components of physical final products. The patterns may be parametric, i.e., they may have parameters that, through encoded relationships, adjust the form of the pattern for a specific need.

For instance, a set of 2D patterns for a t-shirt graded based on size, may become a parametric pattern by interpolating grade curvatures. A single parametric value may set this automatic grading. The single parametric value is usually called a 'size.'

The product instructions may also include models, including 2D and 3D models that are used to form, through additive manufacturing, or subtractive manufacturing, portions of a product. The models may be parametric, i.e., they may have parameters that, through coded relationships, adjust the form of the model for a specific need. For instance, a set of 3D models may represent a bike helmet. Each model may fit a statistically normed human head of a specific age. A coded relationship between the models may allow for interpolation of the set of models for a specific age. A single parametric value may set the automatic interpolation. The single parametric value in this case is usually called an 'age.'

The product instructions may also include material properties such as a physical material used to form a product from a pattern. Some material properties may be parametric, i.e., they may be selected or changed during the manufacturing time.

The properties may also include a body color. For instance, the color of a fabric may be selected for manufacturing a t-shirt. According to another example, the color of a plastic may be selected for manufacturing a bike helmet.

The properties may also include a body texture such as the fabric weave of a t-shirt may be specified to be smooth or slubby. For instance, a surface of a plastic bike helmet may be polished or satin. Each property is necessarily specific to each class of materials. Examples of materials and properties may include a fabric (such as a weave or knit type, a fiber type (cotton, wool, flax, polyester, polypropylene), a thread size, a thread count, a color, an integral design (ikat, knit, tapestry), a bolt width, a selvage type, a surface (hand), and the like.

The properties may also include plastics, which may include sub-properties such as a color, a surface quality (a bidirectional luminance function), a melting point, impact resistance, a forming method (thermoplastic, cast), a type (acrylic, abs, polypropylene, etc.), and the like.

The properties may also include metals, which may include sub-properties such as a type (aluminum, steel, copper, brass, etc.), a color, a surface quality (e.g., a bidirectional luminance function), a melting point, a tensile strength, a shear strength, a toxicity, and the like.

The properties may also include non-woven specified by a type (paper, felt, Tyvek, etc.), a color, a surface quality (e.g., a bidirectional luminance function), a surface type (hot pressed, natural, textured, etc.), a weight per square meter, an acid content, a compatible media, coating, and the like.

The properties may also include metamaterials which may be described as a combination of multiple materials created during a manufacturing process. For instance, during a fused deposition manufacture, plastics with a variety of properties may be mixed to provide a physical product with gradations of flexibility, durometer, and the like. According to another example, during laser sintering of metals, a mix of metal alloys with a variety of properties may be deposited, resulting in a product composed of gradations of metallic properties. According to yet another example, during high resolution uv-printing, layers of the uv-cured material with different refractive indices may be deposited, resulting in a large variety of optical effects.

The properties may also include embellishment such as a trim-color, designs, and applied ornaments. The trim colors may indicate the color of the edging around the sleeve of a t-shirt, the color of the trim around the base of a bike helmet, and the like.

The designs may indicate a custom printed front of a t-shirt, a custom thermal printed design to the side of a bike helmet, and the like.

The applied ornaments may indicate rhinestones on a t-shirt, holographic spangles on a bike helmet, and the like.

Some properties may apply to a large class of products and may allow for a limited set of properties to be transferred from one product to another. Other properties may be specific to a particular product or manufacturing method.

It may be appreciated that much of the novel art of the system and method is in enumerating the constraints imposed by manufacturing a specific custom product, and crafting these constraints as a set of product option key-value pairs. These manufacturing constraints are propagated through the entire system and method, and by using these product option key-values, allowing for the manufacturing of a series of custom products that meet these physical constraints.

Referring again to FIG. 1, in some embodiments, core services 16 refer to services implemented in a role-based collaboration platform. In the depicted example, core services 16 may be provided by one or more real-view (RLV) servers 16A and a product option framework 16AA. Both RLV servers 16A and product option framework 16AA may use one or more data tier databases 16B, including RLV Data 16C, a product options database 16D, a transaction database 16E, and the like.

In some embodiments, core services 16 may also utilize internal tools 16F, such as a "Phlow" computational photographical tools 16E, a customer support tools 16G, a launch pads tools 16H, and the like.

Product option framework 16AA is also referred to as a persistent design data framework. The framework data may include a product options set, which may include a set of product options pertaining to a specific product type. It usually contains the product instructions (e.g., collaboration components 106 in FIG. 2) for manufacturing, or producing, the product.

In some embodiments, product option framework 16AA is configured to provide services for transforming ProductOption key-value pairs (i.e., manufacturing constraints) from one product to the other. Transforming the ProductOption key-value pairs from one product to another may require, for example, transforming the color space (IE sRGB to CMYK US Web Coated (SWOP) v2), transforming an image from rater to vector, and/or resizing the image for the fit.

Figure 2:
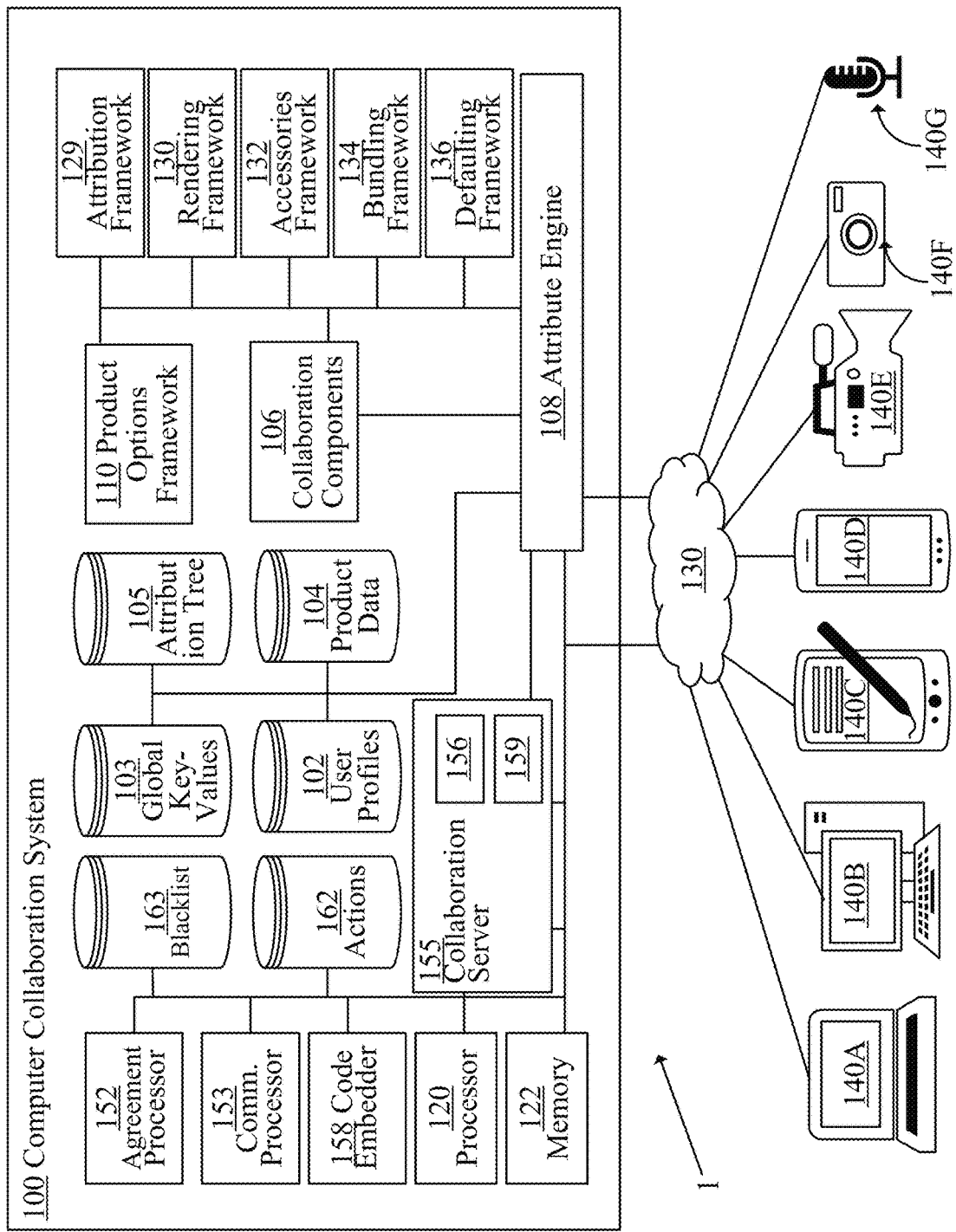
FIG. 2 is a block diagram showing an example of a role-based collaboration platform.

An example use case of the product option framework is described in detail in FIG. 2.

In some embodiments, there are two basic types of product instructions (1) fixed (that include the instructions for the product which are fixed and not customized), and (2) custom (that contain the logic to transform a user interface parameter into a product instruction).

In some embodiments, the product option set contains the logic to enumerate each customizable option in a manner that presents a complete user interface to change the parametric product instructions.

The instructions for manufacturing a customized product are usually parametric. The parameters include the size of the customized product (this can be multi-dimensional, and include width, height, depth). The parameters may also relate to human sizes or age. The parameters may also be custom and based on biometric information.

The parameters may also include a component body color, a component body texture, a trim body color, a trim body texture, a design area, and the like.

In some embodiments, a product option may be represented as a key-value pair. The key-value pair is a label that may span individual products and represent a class of products. The keys of pairs may include a material type, a color, a size, and the like.

The value in a key-value pair is a specific discrete or continuous value that sets a manufacturing instruction. Examples of discrete (enumerated) values may include a discrete type of fabric such as cotton, cotton-polyester blend, silk, and the like. The discrete values may also include specific colors, such as white, navy, black, and the like.

Examples of continuous values of key-value pairs may include a single element, such a length or a ribbon, a vector, such as a size of a frame for a print (width (in inches)) or a height (in inches)), or the size of a box for the European countries, such as a size of a box for the EU (width (in millimeters), height (in millimeters), depth (in millimeters)).

The values may also reference a known file type, such as an image for the design on a t-shirt, such as an embroidery file for the back of a jacket, such as an engraving design for a bracelet, and the like.

In some embodiment, values in key-value pairs may include a set of graphic primitives for a design, such as an image, a line, a circle, a rectangle, a text, a group, and the like.

The product option key-values may have default values. Default values are pre-set values that will produce a product without changing any key-value pairs through customization. When key-values are changed they may produce a product option framework event chain. A product option framework event chain is a journal of each key-value change ordered in time.

A product type may itself be represented by a product option key-value. Using this option type, one product type may be associated with another product type though a well-known relationship.

In some embodiments, a product option framework event chain includes one or more products, and the chain may represent or memorialize an event. The products may represent or memorialize an event. Examples of events may include invitations, save the date cards, birthday cards, birthday gifts, anniversary cards, birth announcements, RSVP cards, holiday cards, holiday gifts, thank-you cards, get-well cards, and the like.

Many products fit into an event chain. For example, the products that fit into a wedding event may include the following products: save the date products, invitations, RSVPs, bachelor party invite products, bachelorette party invite products, party favors products, gift registry cards, place cards, napkins, wedding programs, wedding gifts, thank-you cards, wedding keepsake photos, and the like.

Examples of products that may fit into a birthdate event may include the following products: invitations, RSVPs, party bags, party keepsake photos, and the like.

In some embodiments, in a product option set event chain, a key-value pair encodes the next product in the chain. For example, an invitation may be chained to an RSVP card. A key-value may also encode the role for the chained event. For example, a chained RSVP card key-value may further include a recipient of the invitation as the sender role for the RSVP card.

A key-value pair may also encode the shared properties used to set the chained product's properties. For instance, a design for the invitation may be shared with the RSVP card. A key-value may also encode the timing for the chained product. Typically, the event chain properties are custom (parametric), and they may be changed by a product designer to fit a specific product set.

In an embodiment, a product option framework is configured to generate a product option framework user interface. Accordingly, each product options set is associated with logic and code to build a user interface element for each parametric product option. Furthermore, each product options set contains style hints so that each user interface element may be artfully placed to produce a high quality user experience.

Typically, user interface elements are designed to match each class of values found in all products covered by a product option framework. New user interface elements may be added as the product categories expand. The user interface elements may include a design view, a color editor, a font editor, a size selector, a texture selector, a text editor, a fabric swatch selector, a product real view, and the like.

In some embodiments, a product options framework cooperates with a user product renderer that may be implemented in, for example, a RealView server 16A. The user product renderer may be configured to render views of a custom product as though it is already manufactured. Typically, it uses a product option set of key-values as input. It creates one or more run-time assets using computational photography of the manufactured product.

2.5. Example Manufacturing System

Referring again to FIG. 1, manufacturing instructions may be communicated from core services 16 to manufacturing 16, which may include one or more manufacturing servers 16AAA. Servers 16AAA may receive the manufacturing instructions, process the instructions, and communicate with a vendor manufacturing application 18A to generate, for example, manufacturing data, operator directions, tool/machine codes, and the like. The application may also generate information about an order state, a packing slip, a production sheet, and the like. Some of that information may be communicated to a carrier (shipping) service selected to deliver the final products to the recipients.

A final product may be manufactured using markups. A markup for, for example, a body color of a product may be made by specifying a distinct and separate color for Body-Color key-value. A markup for the trim color of a product may be made by specifying a distinct and separate color for, for example, a TrimColor key-value pair. A markup for a design area of a product may be made by specifying a specific marker type (e.g., a removable linear markup, a digital markup, or a digital field markup) for a design-area image.

Construction of a so-called Product RealView geometry may be performed using computational photographic techniques. For example, a BodyColor area of a surface may be recognized and layered as a custom computer graphics shader for rendering light, color, and texture. Each TrimColor area's surface may be recognized and layered as a custom computer graphics shader for rendering light, color, and texture. Rendering of the Product RealView may be performed by setting its product option key-values, and shading each of its constructed layers.

2.6. Example Manufacturing Process

As described above, a manufacturing process may pertain to manufacturing a digital product as well as manufacturing a physical product. Since the manufacturing instructions for generating a product are generated based on a plurality of key-value pairs for a digital design of the product, in some situations, the same manufacturing instructions may be used to manufacture the digital product as well as to manufacture the physical product.

In some embodiments, a product options framework (described in detail in FIG. 2) builds an interface for a key called OutputStyle. The interface for the OutputStyle key may allow a designer (or any other collaborator) to select values for the media for the presentation of an interactive design. The choices may include a JPEG_Image, a GIFF_Image, and an H264_Video.

If a designer chooses the GIFF_Image option, then the product options framework may send the instructions to the manufacturing system to traverse each of the key-values in the KeyValueJournal, and for each key, and use a User Product Renderer to render the state of the custom physical product with that modification as images in the sRGB 32-bit RGBA format. Subsequently, the manufacturing system may store the renderings in a local image cache.

Then, the manufacturing system may traverse the images stored in the local image cache and determine an optimal color palette for that collection of images.

Subsequently, the manufacturing system may convert the images in the local image cache from 32-bit RGBA format to 8 bit Indexed color.

Then, the manufacturing system may embed a digital watermark which encodes the input KeyValueJournal's UUID in the 8 bit indexed color image cache.

Next, the manufacturing system may begin encoding the image file. For example, the manufacturing system may write the header bytes; write the Logical Screen Descriptor bytes; write the found color palette as a gif Global Color Table; write the gif 8 bit character application name; and embed metadata as a comment (or a watermark) which encodes the input KeyValueJournal's UUID.

Next, the manufacturing system sets a FrameCount to 1 and proceeds to processing each frame in the image file. The processing includes checking if there is an image in the 8 bit indexed color image cache; and if so, then the manufacturing system continues; otherwise, the manufacturing system proceeds to taking the next image.

To continue, the manufacturing system writes the gif Graphic Control Description for the FrameCount, and then processes the first 8 bit indexed color image cache into blocks of 255 LZW compressed bytes.

Next, the manufacturing system writes the compressed bytes, and removes the first image from the 8 bit indexed color image cache. Then, the manufacturing system increments the FrameCount and repeats the process for the next frame.

Once the manufacturing system processes all frames, the manufacturing system writes the file terminator (such as an ASCII code for zero) to the image file and outputs the manufactured GIF product.

At this point, executing the manufacturing instructions for the purpose of manufacturing the product ends, and the manufacturing of the product is completed.

2.7. Example Product Collaboration Platform

In some embodiments, the approach for generating and using tokens to request services and access to a product collaboration platform may be implemented in one or more computer systems that host a product collaboration platform. Alternatively, the approach may be implemented in one or more computer systems that communicate with the collaboration platform but that do not actually host the platform itself. For the clarity of the description, it is assumed that the computer environment supporting the approach presented herein is implemented in the product collaboration platform.

FIG. 2 is a block diagram showing an example of a role-based collaboration platform.

In the example depicted in FIG. 2, a computer collaboration system 100 includes a user profiles database 102, a global-key-values database 103, a product data definitions database 104, an attribution trees database 105, collaboration components 106, a product options framework 110, an attribute engine 108, one or more processors 120, one or more memory units 122, and one or more frameworks 129-136.

Furthermore, computer collaboration system 100 includes a collaboration server 155 (including a monitoring system 156, and a request analyzer 159), one or more blacklist databases 163, one or more actions databases 162, an agreement processor 152, a communications processor 153, and a code embedder 158. Computer collaboration system 100 may communicate directly, or via one or more communications networks 130, with one or more user computers 140A-140G, all described in detail later.

Computer collaboration system 100 shown in FIG. 2 is provided herein to illustrate clear examples and should not be considered as limiting in any way. Other computer collaboration systems may include additional components such as computer servers, various input/output devices, and additional software and/or hardware components that are not depicted in FIG. 2. Other computer collaboration systems may be implemented in cloud-based systems, distributed computer networks, and the like. Other computer collaboration systems may include fewer components than example computer collaboration system 100 shown in FIG. 2. Computer collaboration system 100 is described in details later.

3. Differences Between Tokens Describing Products and Tokens Used to Request Services and Access Throughout this disclosure, it is assumed that tokens describing products, created using a product collaboration platform, are expressed as digital data, and are stored at a location (identified using a hyperlink) in a storage unit, while tokens used to request services and access to the product collaboration platform are encoded in token labels attached to, or shown on, the actual products. The tokens describing products, created using a product collaboration platform, are referred to as digital tokens. That, however, does not distinguish the tokens describing the products from the tokens used to request services and access because the tokens used to request services and access may also be digital.

3.1. Digital Tokens Describing Products

In some embodiments, a digital product token functions as a representation of a custom digital product and/or a physical product. A token may be also referred to as a DigitalProductToken. Functionalities of the DigitalProductToken may be captured in a plurality of global key-value pairs that are journaled during an interactive session when an interactive digital design is created. The global key-value pairs journaled for the interactive digital design are referred to as a journaled global key-value pairs. The global key-value pairs comprise associations between the attribute keys and the values of the corresponding keys. The global key-value pairs include global keys (available to one or more collaboration sessions), while values are specific to the particular collaboration session.

In some embodiments, digital product tokens are used to represent custom digital products and custom physical products. A digital token is digital information that references in some way a plurality of key-value pairs that has been journaled during an interactive process of creating an interactive design and stored at some location in storage. The plurality of key-value pairs describes the interactive design and may be used to generate manufacturing instructions for manufacturing a product corresponding to the interactive design. The pairs may be stored at, for example, a collaboration platform or a cloud system available to collaborators and manufacturers. The location may be identified using, for example, a universal unique identifier (UUID) or a URL. The digital token may correspond to, for example, the UUID and may be made available to the collaborators and the manufacturers to facilitate access to the plurality of key-value pairs. The pairs may be conveniently shared with the manufacturers and other digital product delivery platforms.

A digital product token may be represented purely digitally. A location at which a digital token is stored may be represented as a universal unique identifier (UUID) that also uniquely identifies a plurality of key-value pairs for an interactive design. The token may also be a URL pointing to the location at which the plurality of key-value pairs has been stored.

Generally, a digital token is understood to capture a plurality of key-value pairs (constraints) or an actual representation of the plurality of key-value pairs (constraints).

A plurality of the pairs may be used to generate a variety of forms of the digital product. For example, suppose that a user uploaded a photograph to a website specializing in providing image-retouching services and a designer or an artist affiliated with the website retouched the uploaded image. Once the retouched image is approved by the user, a digital token for the retouched image is created. A UUID identifying the key-value pairs or a URL pointing to a location where the key-value pairs are stored is created. The pairs may be used to generate manufacturing instructions for generating various forms of the retouched image.

Furthermore, the UUID/URL may be used to retrieve the key-value pairs, which in turn may be used to generate a digital representation of the retouched image, as well as to generate a digital image file (e.g., a tiff file, a jpeg file, or the like) representing the retouched image. Moreover, the plurality of key-value pairs may be used to generate a video file representing an interactive process of generating the interactive digital design.

In some embodiments, a token captures manufacturing instructions for a product that may be created and sold purely digitally and/or sold as a physical product. The token itself may be delivered digitally and consumed digitally rather than being physically created and physically printed.

In this context, manufacturing instructions may be understood as the instructions for generating and delivering a digital product, as well as the instructions for generating and delivering a physical product corresponding to the digital product. In fact, as it will be explained later, in some situations, both types of the instructions may be the same manufacturing instructions.

Throughout this disclosure, a manufacturing process pertains to manufacturing a digital product as well as manufacturing a physical product of an interactive product. Hence, since the manufacturing instructions for generating a product may be generated based on the same plurality of key-value pairs for the interactive product, in some situations, the same manufacturing instructions may be used to "manufacture" the digital product as well as to manufacture the physical product.

A digital token capturing a plurality of key-value pairs, or a UUID/URL may be embedded in product description data generated for an interactive design, and the product description data having the embedded token may be communicated to a manufacturing entity to cause the manufacturing entity to retrieve, using the token, the plurality of key-value pairs and use the pairs to generate manufacturing instructions for manufacturing a digital custom product (such as a graphical depiction of a digital image) and/or a physical custom product (such as a physical photograph) corresponding to the digital image.

A digital token of a digital product captures a plurality of key-value pairs that corresponds to an associated set of constraints. The constraints may correspond to a set of options of a corresponding digital product (e.g., a digital greeting card) and/or a physical product (e.g., a physical greeting card). The set of constraints associated with the token may capture all the options of the digital product as well as of the physical product. The constraints may include, for example, a set of colors schemes used to represent the digital product, a set of sizes and aspect ratios of the digital product, a set of images included in the digital product, a set of fonts and font sizes used to represent the text included in the digital product, and the like.

3.2. Tokens Used to Request Services and Access

In addition to the tokens used to describe products, there are tokens that may be used to request services and access to a product collaboration platform. While a digital product token functions as a representation of a custom digital product and/or a physical product and contains digital data stored in storage, a token used to request services and access to the product collaboration platform may be encoded in a token label shown on, or attached to, the actual product. In some embodiments, those two types of tokens may be combined into one type of token.

However, for a simplicity of the description, it is assumed that a token describing a product is expressed as digital data and is stored at a location (identified using a hyperlink) in a storage unit, while a token used to request services and access to a product collaboration platform is encoded in a token label attached to, or shown on, an actual product.

Figure 3:
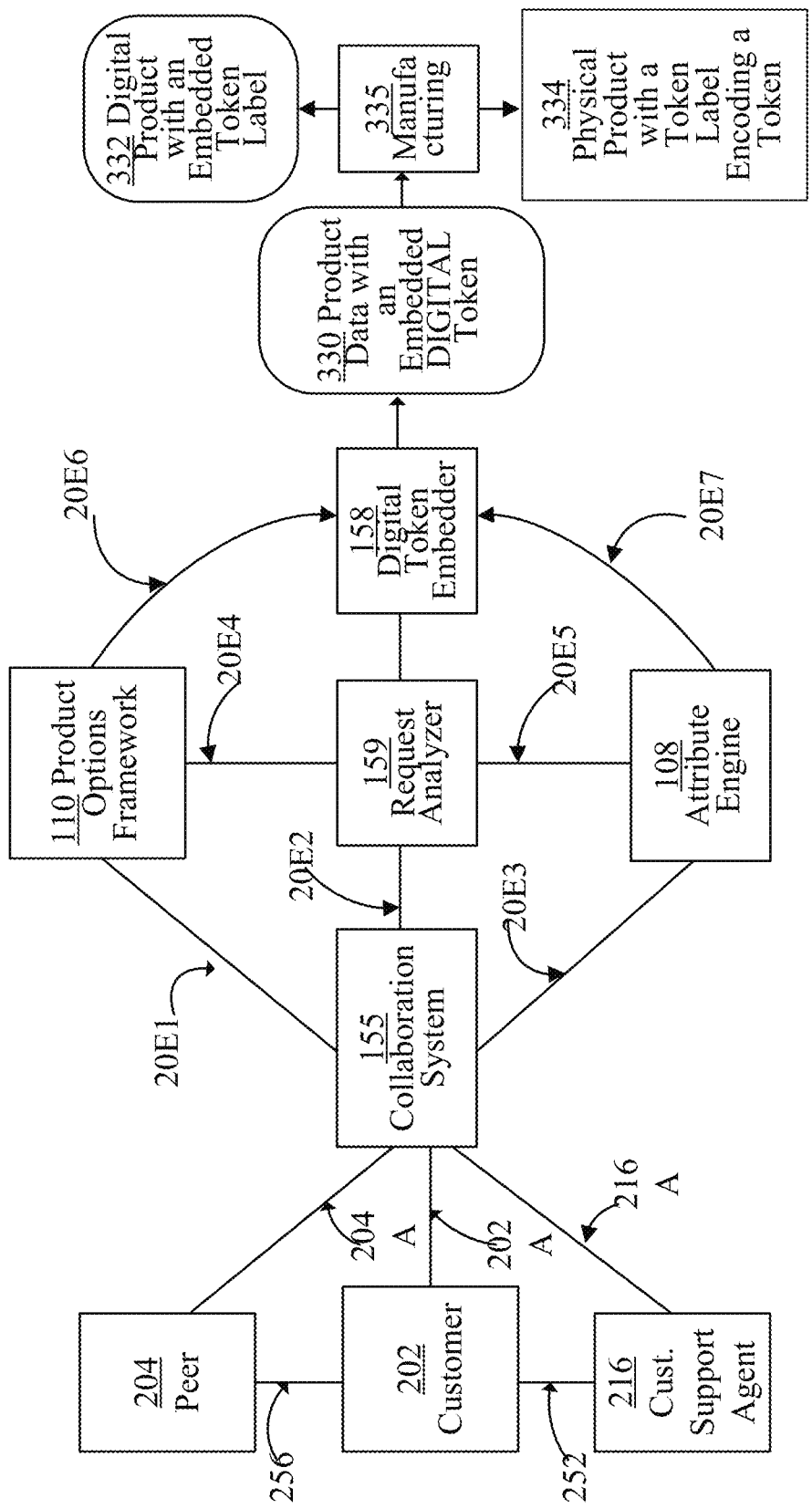
FIG. 3 is a block diagram showing an example of using tokens to request services and access to a product collaboration platform.

FIG. 3 is a block diagram showing an example of using tokens to request services and access to a product collaboration platform. In the depicted example, customer 202 collaborates with peer 204 and customer support agent 216. The roles of individuals 202, 204 and 216 and the different ways of collaborating are described in detail in FIG. 8. In other examples, customer 202 may contemporaneously collaborate with several peers, several support agents, and/or several designers.

In FIG. 3, customer 202 communicates with peer 204 via a communications session established along link 256 and communicates with customer support agent 216 via a communications session established along link 252.

In some embodiments, collaboration system 155 receives (element 202A) modifications implemented and accepted by customer 202, receives (element 204A) modifications implemented and accepted by peer 204, and receives (element 216A) modifications implemented and accepted by customer support agent 216.

Collaboration system 155 may cooperate with product options framework 110 and transmit (20E1) data to product options framework 110. Collaboration system 155 may also collaborate with attribute engine 108 and transmit (20E3) data to collaboration system 155.

Furthermore, collaboration system 155 may cooperate with request analyzer 159 and transmit (20E2) a request for, for example, corresponding physical product and/or digital designs, to request analyzer 159.

In some embodiments, request analyzer 159 may request and receive (20E4) the data from product options framework 110. Furthermore, request analyzer 159 may request and receive (20E5) the data from attribute engine 108.

Collaboration system 155, product option framework 110, attribute engine 108 and request analyzer 159 may cooperate with each other. This may include journaling a plurality of key-value pairs generated during the interactive session during which peer 204, customer 202 and customer support agent 216 create the interactive digital design. This may also include transforming ownership and license agreements, embedded in the plurality of key-value pairs journaled during a collaboration session, into a graph-network and then into an ownership-agreement tree. This may also include evaluating the ownership-agreement tree with respect to communications channels 256 and 252, established between customer 202, peer 204 and customer support agent 216, respectively to determine whether any communications between any users 202, 204 and 216 violated any constraints included in the ownership-agreement tree.

Collaboration system 155, product option framework 110, attribute engine 108 and request analyzer 159 may also cooperate with each other when a request for ordering, for example, a physical product corresponding to the interactive digital design is received. In response to receiving the request, collaboration system 155, product option framework 110, attribute engine 108 and request analyzer 159 may collaborate to generate, determine, or retrieve, a token 330 that represents a plurality of key-value pairs for the interactive design.

In some embodiments, digital token 330, capturing a plurality of key-value pairs for the product, may be stored at a location in a storage unit. The location may be identified using a hyperlink or a UUID, described before.

In some embodiments, the hyperlink pointing to the location at which the plurality of key-value pairs is stored, or the UUID, is communicating to a manufacturing server 335. Manufacturing server 335 may retrieve, based on the hyperlink or the UUID, the plurality of the key-value pairs, and translate the pairs into, for example, manufacturing instructions for manufacturing an actual product. Then, manufacturing server 335 may use the manufacturing instructions to manufacture, based on the key-value pairs, an actual product. Depending on the manufacturing instructions, the actual product may be either a digital product 332 or a physical product 334.

Digital product 332 may be a digital greeting card, a digital invitation, or the like. Physical product 334 may be a physical water bottle, a physical mug, or the like.

In some embodiments, manufacturing server 335 generates a token that captures token data and describes how a user may request services related to the manufactured product, and how to access a product customization platform. The token, i.e., token digital data, may be encoded in a token label.

In some embodiments, if the actual product is digital product 332, then a token label is a token digital label pasted into an image of digital product 332. However, if the actual product is physical product 334, then a token label is a token physical label attached to the physical product 334.

4. Tokens to Request Services and Access

There are many implementation examples of applications of tokens used to request services and access to a product customization platform. Generally, the tokens may be used to leverage millions of physical products to connect users into their community on the product collaboration platform and differentiate via the highly personal and specific context. Conceptually, token-based mechanisms are used to allow the users to provide clear context for their experience with the platform. They also provide an opportunity to utilize a variety of concepts related to the product collaboration platform and the manufacturing platform for the customized products.

4.1. Tokens

In some embodiments, tokens used to request services and access to a product collaboration platform are represented using token labels that include codes, such as QR codes, bar codes, and the like.

Quick Response (QR) codes are capable of storing a great deal of data. When scanned, the QR codes allow users to access information instantly. One of the advantages of a QR code is that the QR code can be read in two directions (hence, the QR code is sometimes referred to as "two-dimensional barcode")—top to bottom and right to left. This allows the QR code to house significantly more data. The QR codes are widely adopted by many industries, including automotive, food, pharmaceuticals, manufacturing, and other products.

The patterns within QR codes represent binary codes that can be interpreted to reveal the code data. A QR reader can identify a standard QR code based on the three large squares outside of the QR code. Once the three shapes are identified, it is easy to determine that everything contained inside the square is an actual QR code.

The QR reader analyzes the QR code by breaking the whole code down to a grid. It looks at the individual grid squares and assigns each one a value based on whether it is black or white. It then groups grid squares together to create larger patterns.

4.2. Generating Tokens for Requesting Services and Access

Figure 4:
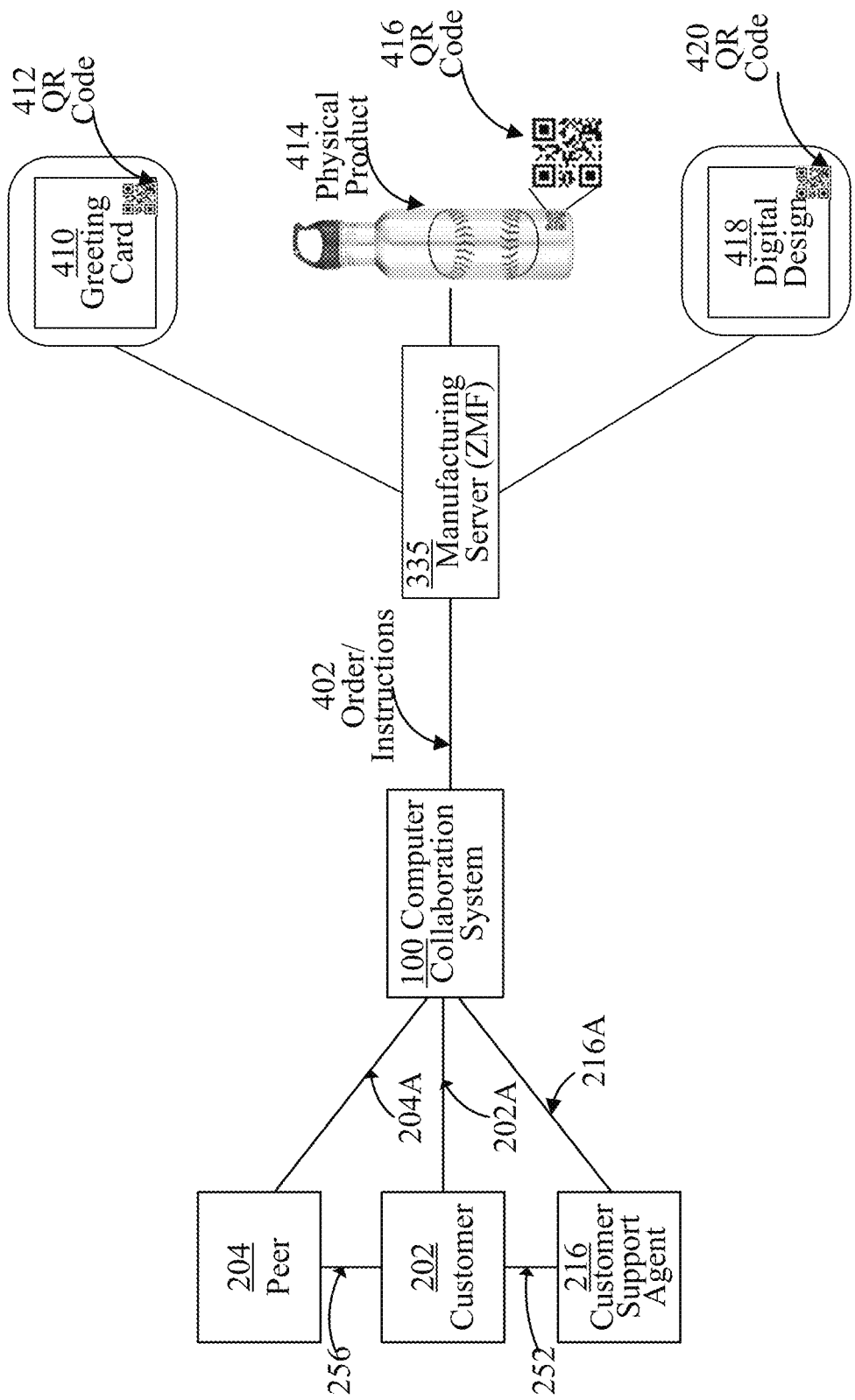
FIG. 4 is a block diagram showing an example of using tokens to request services and access to a product collaboration platform.

FIG. 4 is a block diagram showing an example of using tokens to request services and access to a product collaboration platform. In FIG. 4, customer 202 communicates with peer 204 via a communications session established along link 256 and communicates with customer support agent 216 via a communications session established along link 252. Suppose that customer 202 communicates with peer 204 via a communications session established along link 256 and communicates with customer support agent 216 via a communications session established along link 252.

In some embodiments, collaboration system 155 receives (element 202A) modifications implemented and accepted by customer 202, receives (element 204A) modifications implemented and accepted by peer 204, and receives (element 216A) modifications implemented and accepted by customer support agent 216.

Collaboration system 155 may cooperate with product options framework 110 (not shown), attribute engine 108 (not shown), and request analyzer 159 (not shown) when a request 402 for ordering, for example, a physical product corresponding to the interactive digital design is received. The details of processing the request are described in FIG. 3.

In response to receiving request 402 for a product, collaboration system 155 may generate, determine, or retrieve, a token that represents a plurality of key-value pairs for the interactive design. The token, capturing a plurality of key-value pairs for the product, may be stored at a location in a storage unit. The location may be identified using a hyperlink or a UUID, described before.

In some embodiments, the hyperlink pointing to the location at which the plurality of key-value pairs is stored, or the UUID, is communicating to a manufacturing server 335. Manufacturing server 335 may retrieve, based on the hyperlink or the UUID, the plurality of the key-value pairs, and translate the pairs into, for example, manufacturing instructions for manufacturing an actual product. Then, manufacturing server 335 may use the manufacturing instructions to manufacture, based on the key-value pairs, an actual product. Depending on the manufacturing instructions, the actual product may be a digital product 410, a physical product 414, or a digital design 418.

In the example depicted in FIG. 4, digital product 410 is a digital greeting card; physical product 414 is a physical water bottle; and digital design 418 is a digital screen background. These examples are provided to merely illustrate some options.

In some embodiments, manufacturing server 335 generates a token that captures token data describing how a user may request services related to the manufactured product, and how to access a product customization platform. The token, i.e., token digital data, may be encoded in a token label.

If the actual product is digital product 410, then a token label 412 is a token digital label pasted into an image of digital product 410. If the actual product is physical product 414, then a token label 416 is a token physical label attached to the physical product 414. If the actual product is digital design 418, then a token label 420 is a token digital label pasted into an image of digital design 418.

4.3. Using Tokens to Request Services and Access

4.3.1. Using Tokens to Request Sending Gifts to Others

Figure 5:
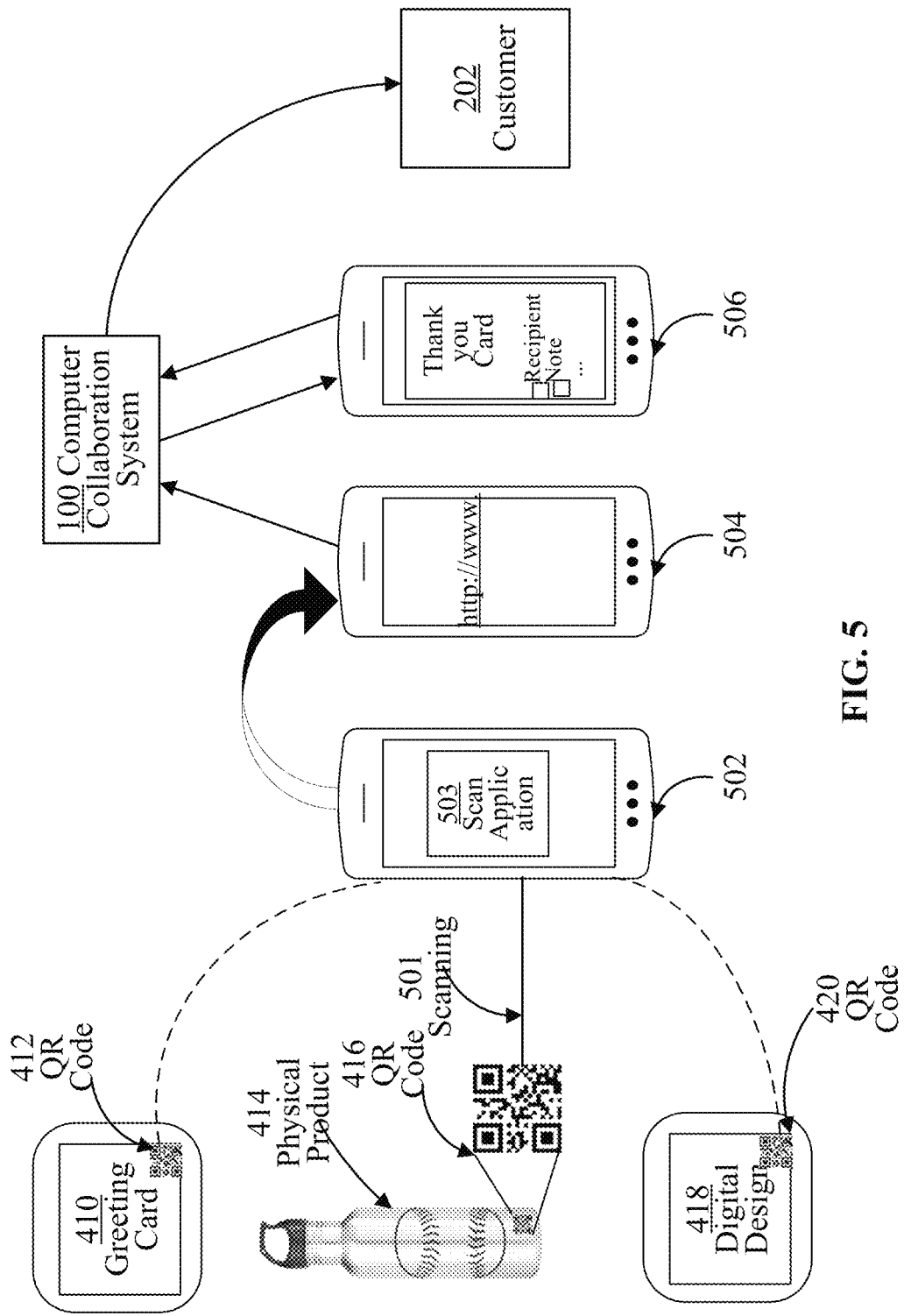
FIG. 5 is a block diagram showing an example of using tokens to request services and access to a product collaboration platform.

FIG. 5 is a block diagram showing an example of using tokens to request services and access to a product collaboration platform. Some of the elements depicted in FIG. 5 have been already described in FIG. 4.

Suppose that a user received physical product 414 from a customer 202. Suppose that physical product 414 is a water bottle, and the bottle has physical label 414 attached to the bottle. Suppose that physical label 414 includes a QR code.

In the depicted example, it is assumed that a user scanned (element 501) the QR code shown on label 416 attached to water bottle 414 using a camera and a software application 503 integrated in a smartphone 502. Upon the scanning, application 503 allows reading the QR code, translating the QR code into token digital data, and extracting from the token digital data a hyperlink that allows requesting services and access to a computer collaboration system 100.

In some embodiments, the hyperlink (or an alphanumeric representation of the domain name of computer collaboration system 100) may be displayed on a screen of the smartphone. This is shown using an element 504.

In some embodiments, if a user confirms, or accepts, that he wants to access computer collaboration system 100, a communications connection is established between the user's smartphone and computer collaboration system 100, and data facilitating generating and downloading graphical representation of a GUI for requesting services and access to collaboration system 100 are exchanged.

In the depicted example, collaboration system 100 transmits, via the communications connection, graphical representation data for generating, using a browser, a GUI depicting a webpage allowing the user of the smartphone to customize, for example, a thank-you card, that the user may send to customer 202 as a sign of appreciation for receiving water bottle 414 from customer 202. This is shown using an element 506.

The GUI may provide various options for customizing the thank-you card. The customization options may include the options for customizing the text of the card, customizing the appearance of the note in the card, customizing the background, adding some pictures to the card, and the like.

Once a user completes the customization of the thank-you card, the user may send instructions to collaboration system 100 to send the customized thank-you card to customer 202.

In response to this request, collaboration system 100 may process the request, determine a recipient address, e.g., an email address of customer 202, and digitally transmit the customized thank-you card to customer 202. Alternatively, collaboration system 100 may request generating a physical thank-you card corresponding to the digitally designed thank-you card, and request sending the physical thank-you card to customer 202.

The above example is one of many examples of requesting services from collaboration system 100.

4.3.2. Using Tokens to Request Joining a Community

Figure 6:
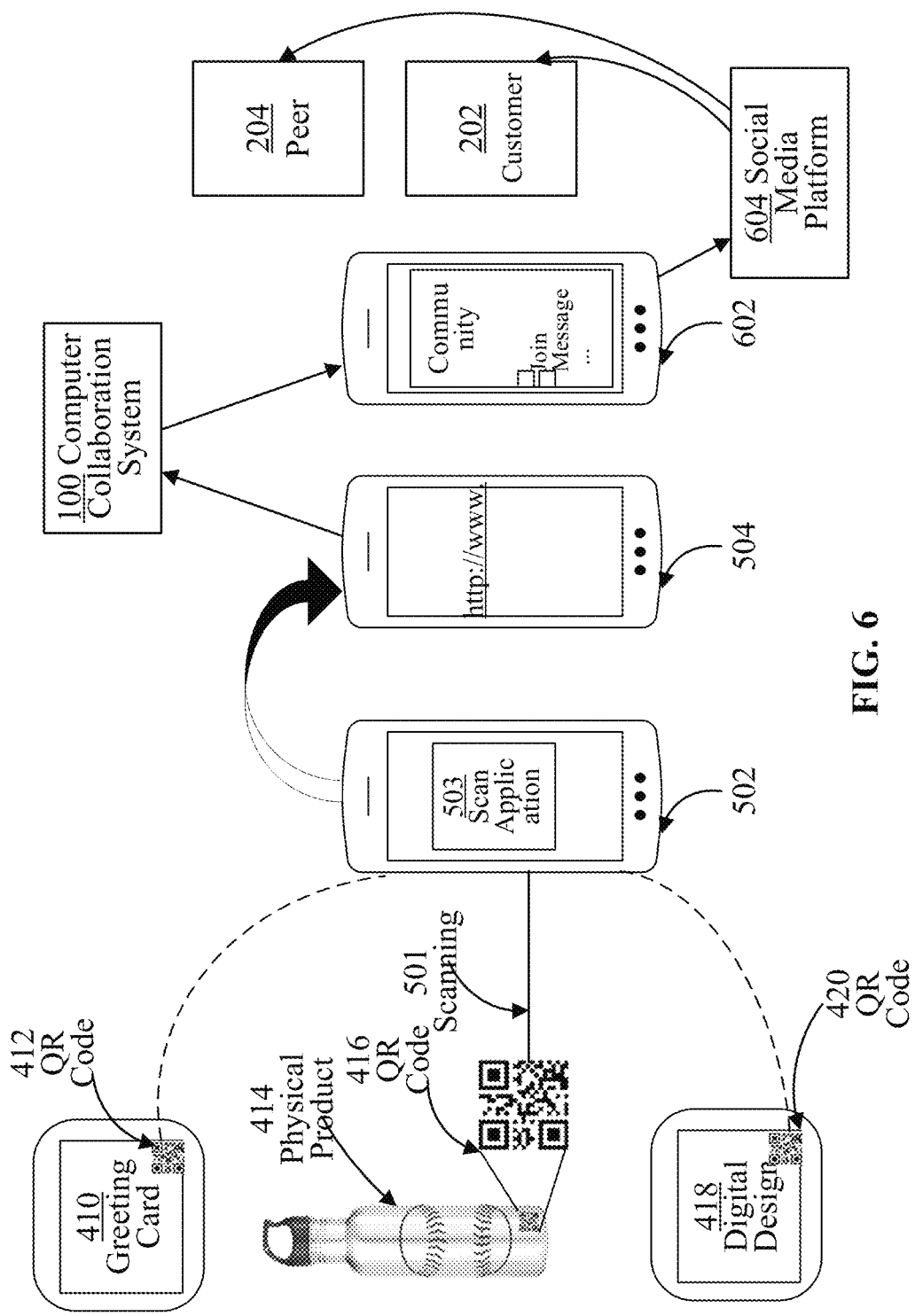
FIG. 6 is a block diagram showing an example of using tokens to request services and access to a product collaboration platform.

FIG. 6 is a block diagram showing an example of using tokens to request services and access to a product collaboration platform. Some of the elements depicted in FIG. 6 have been already described in FIG. 4-5.

Suppose that a user received physical product 414 from a customer 202. Suppose that physical product 414 is a water bottle, and the bottle has physical label 416 attached to the bottle. Suppose that physical label 416 includes a QR code.

In the depicted example, it is assumed that a user scanned (element 501) the QR code shown on label 416 attached to water bottle 414 using a camera and a software application 503 integrated in smartphone 502. Upon the scanning, application 503 allows reading the QR code, translating the QR code into token digital data, and extracting from the token digital data a hyperlink that allows requesting services and access to a computer collaboration system 100.

In some embodiments, the hyperlink (or an alphanumeric representation of the domain name of computer collaboration system 100) may be displayed on a screen of the smartphone. This is shown using an element 504.

In some embodiments, if a user confirms, or accepts, that he wants to access computer collaboration system 100, a communications connection is established between the user's smartphone and computer collaboration system 100, and data facilitating generating and downloading graphical representation of a GUI for requesting services and access to collaboration system 100 are exchanged.

In the depicted example, collaboration system 100 transmits, via the communications connection, graphical representation data for generating, using a browser, a GUI depicting a portal for a social community to which, for example customer 202 belongs. Non-limiting communities include a LinkedIn™ community, a Facebook™ community, and the like. This is shown using an element 602.

Accessing a particular social community may include requesting access credentials, creating a using profile, and the like. That may be facilitated via communications exchanged between a user of the smartphone 602 and a social media platform 604.

Once the user gains access to social media platform 604, the user may interact with customer 202 who sent water bottle 414 as a gift to the user. The user may also interact with other users who collaborated with customer 202 in designing water bottle 414. Those may include peer 204, and others.

The above example is one of many examples of requesting access to a social community from collaboration system 100.

4.4. Example Flow

Figure 7:
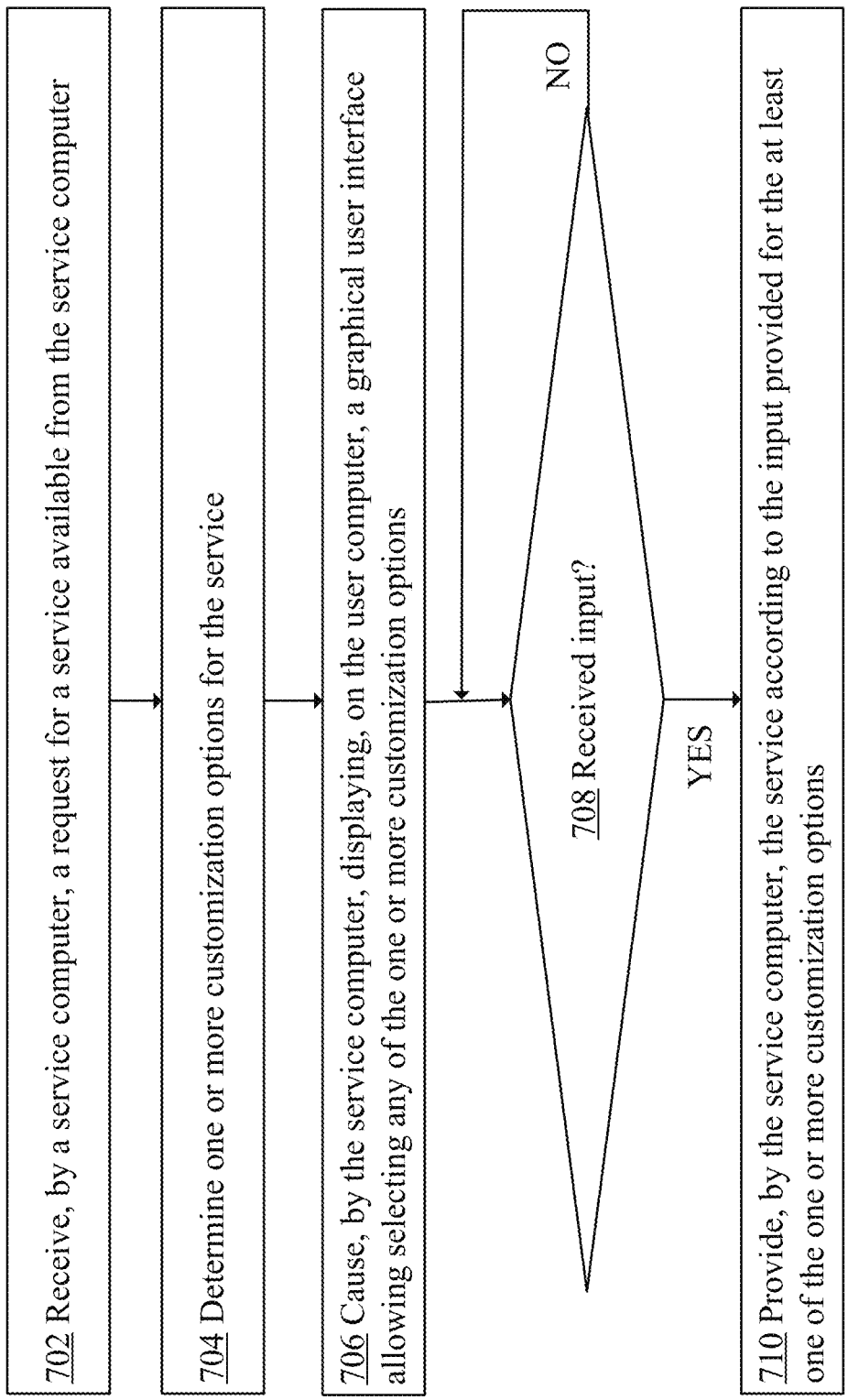
FIG. 7 is a flow chart showing an example process of using tokens to request services and access to a product collaboration platform.

FIG. 7 is a flow chart showing an example process of using tokens to request services and access to a product collaboration platform. The steps described in FIG. 7 may be performed by any computer-based system, including a product collaboration platform, also referred to as a service computer. The service computer may be configured to, for example, facilitate creating and customizing digital designs, ordering products generated based on the digital designs, providing functionalities for sending thank-you cards in response to receiving the products, and the like.

In step 702, a service computer receives a request for a service available from the service computer. In some embodiments, the request may include information that, prior to being transmitted from the user computer to the service computer, was generated based on, at least in part, a token. The token might have been encoded in a token label attached to a product. The token label could be scanned, or otherwise read, and translated into token digital data, and then used to generate the request.

In this context, a token label may include, or depict, a QR code (such as a Maxi Code, a PDF417 code, a Semacode), a bar code, a universal product code, an embedded signal code, or any other types of code, or a tag, that may be affixed, attached, or printed as a label and shown on a physical product or that may be shown as a digital label on a digital product. A token label may be scanned using a digital scanning device to generate scanned data, and the scanned data (i.e., the token) may be provided to the user computer, which in turn may send the scanned data to the service computer. The scanning of the token label may be performed using, for example, a camera implemented in the user device such as a smartphone, a standalone scanning device that is capable of transmitting the scanned data to the user device, and the like.

In some embodiments, the scanned data (i.e., the token digital data) may be processed by the user computer to generate the request. The request, received by the service computer from the user computer, may include a hyperlink associated with the service and an indication of a product to which the service pertains.

Once the request is received from the user computer, the service computer may parse the request, and identify the hyperlink included in the request. Then the service computer may use the hyperlink to generate graphical representation data for a webpage identified by the hyperlink and transmit the graphical representation data to the user computer to cause the user computer to launch a browser on the user computer and to use the graphical representation data to generate and display the corresponding webpage. Launching the browser on the user computer may also include generating graphical representation of the requested service(s) and products associated with the product that is indicated in the request received by the service computer from the user computer, and that are available from, or via, the service computer.

In step 704, in response to receiving the request for the service, the service computer determines one or more customization options for the service. The customization options depend on the type of service(s). Non-limiting examples of services are described in FIG. 5-6.

In step 706, the service computer causes displaying, on the user computer, a graphical user interface allowing a user of the user computer to provide input to any of the one or more customization options. Examples of the options depend on the type of service that has been requested. For example, if the service pertains to sending a thank-you card, then the options may include an option for entering an email address of a recipient of the thank-you card, an option for modifying text of the thank-you card, and the like.

In step 708, the service computer tests whether input for at least one of the one or more customization options for the service has been received. If, in step 708, the service computer determines that the input has been received, then the service computer proceeds to step 710. Otherwise, the service computer continues awaiting the input in step 708.

In step 710, in response to receiving, from the user computer, the input for at least one of the one or more customization options for the service, the service computer provides the service according to the input provided for the customization options.

Examples of services requested from a product collaboration platform may include requests for services such as sending thank-you notes, joining a community of designers and customers that use the platform, reordering the products, and the like. Furthermore, the services may include creating and designing party invitations, creating and designing greeting cards, creating and designing gifts, and the like. The services may also include scheduling and planning events that occur periodically, such as birthdays, anniversaries, due dates, and the like. The services may further include planning events such as weddings, welcome-home parties, graduation parties, and the like. Moreover, the services may include sharing pictures and comments with friends, families, acquaintances, and coworkers.

Providing the service according to the customization options may include generating, for example, a thank-you card and sending the thank-you card according to the input provided for the customization options by a user of the user computer.

4.5. Tokens in Greeting Cards

According to one example, a physical water bottle that was designed using capabilities of a product collaboration platform, has an attached or affixed QR code that provides means for launching a website of the platform. Once a recipient of the water bottle receives the bottle, the recipient may scan the QR code shown on the bottle using, for example, a camera of a smartphone. Upon scanning the code, the recipient may access a particular webpage of the platform's website to allow the recipient to, for example, compose a thank-you card and email the thank-you card to a sender of the water bottle. The recipient may also access a webpage of the website configured to compose and email a message to other recipients of the water bottle, send a message to designers and collaborators, or join the community of the platform's customers. This may include, for example, providing mechanisms for connecting to a user group on LinkedIn™, sharing the follow up information, and the like.

In some embodiments, a greeting card includes a QR code that a recipient can scan on their phones that would link back to an "outtake" gallery, video message, etc. on the product collaboration platform. The QR code could, for example, provide the capability for integrating an additional content experience specific to the received product. For example, if a physical holiday card is received, the QR code could be scanned and, indirectly integrate an additional content experience specific to the context of that card. In response, the recipients could, for example, leave private messages/feedback, communal messages, etc. This would allow providing a differentiated experience in a product-customization-space, and also to engage and acquire new users as these recipients engage. Furthermore, an option of a "mail merge" may allow sending the cards to each recipient directly along with individualized messages and the ability to provide feedback.

4.6. Tokens in Invitations

When a user orders a gift, such as an invitation, for himself or for one or more recipients, each invitation may include a QR code. By scanning the QR code, the user, or the recipient, may invoke simple QR-based mechanisms to engage the user, reconnect him with the invitation's sender, and provide an access to the product collaboration platform.

Suppose that a recipient received an invitation, and a gift card (free or upcharge) was included. Upon receiving the gift, the recipient may have the opportunity to send quickly and easily a thank you card back to the gift's sender. If the platform sends a recipient a personalized card, the recipient may have the platform to generate a thank you card on behalf of the recipient. Furthermore, the platform may "create" a digital experience associated with the gift. For example, the platform may allow the recipient to automatically take pictures of the received product and send the pictures to the gift's sender. The platform may be configured to automatically create a feedback digital gift page for every gift sent or received. The feedback actions may be archived as a story associated with the gift, its use, feedback, etc. The platform may also allow the sender and the recipient to calendar the date when the gift was sent, and other reminders related to thank you notes, pictures, etc.

4.7. Tokens in Gifts

When a user orders a gift for himself or for one or more recipients, each gift may include a QR code. By scanning the QR code, the user, or the recipient, may invoke simple QR-based mechanisms to engage the user, reconnect him with the gift's sender, and provide an access to the product collaboration platform. Suppose that a recipient received a gift. Upon receiving the gift, the recipient may have the opportunity to send quickly and easily a thank you card back to the gift's sender. Furthermore, the platform may "create" a digital experience associated with the gift. For example, the platform may allow the recipient to automatically take pictures of the received gift and send the pictures to the gift's sender. The platform may be configured to automatically create a feedback digital gift page for every gift sent or received. The feedback actions may be archived as a story associated with the gift, its use, feedback, etc. The platform may also allow the sender and the recipient to calendar the date when the gift was sent, and other reminders related to thank you notes, pictures, etc.

4.8. Tokens in Memorialized Creations

Using the presented collaboration platform, customers may use a variety of different tools (such as texting, social media, social platform, and the like) to send thank-you notes and messages. The described herein platform is configured to create highly contextual experiences for engagement and feedback around the customized product sent and received by the users. For example, for each gift or product, the approach allows creating a clear history of how the product was created (e.g., collaboration), how the product was made, when the product was received and used, and how to engage the community in the process.

QR codes embedded in the products are one way for facilitating the creation of highly contextual experiences. They provide mechanisms for connecting the users with other users interacting with the product collaboration platform. The users may participate in such highly contextual experiences via applications executing on their mobile devices, via applications served by clients, or via the Web.

4.9. Tokens in Business Cards

In an embodiment, a user may order, using a product collaboration platform, a set of business cards either for himself or for someone else. Each of the cards may include a QR code. If the user, or a recipient of the card, scans the QR code embedded on the business card, the QR code may allow obtaining and digitally sharing the information related to customization, creating, delivery, feedback, and comments available or related to the business card. Furthermore, it may allow to connect the user, the recipients, collaborators, and others who belong to the community created by the virtue of creating and delivering the business cards. This may include, for example, providing mechanisms to facilitate connecting into LinkedIn™, sharing the follow up information, and the like.

5. Role-Based Collaboration Platform

5.1. Role-Based Collaboration

In some embodiments, a role-based collaboration includes a collaborative customization of digital product designs and tracking of the collaboration attribution to the designs during the customization process. The customization may include receiving, at a computer collaboration server, product description data for an interactive digital design. The product description data for the interactive digital design may include data describing how to generate a graphical visual representation of the interactive product and how to generate physical products that are capable of custom manufacture.

The product description data may comprise a plurality of global-key-value pairs journaled within the product description data as the interactive digital design is customized by collaborating users, designers, and support engineers. A global-key-value pair usually includes a key and a value associated with the key. In a pair, a key corresponds to a keyword representing an attribute, while a value corresponds to a value of the attribute. The global-key-value pair is referred to as global because it is global to a current collaboration session. In a global pair, while the key has a persistent meaning across all transactions, the value is scoped to a specific collaboration session. Global key-values possess a 'global' key known across a specific product line, such global key-values may be created, and its value modified during a particular collaboration session are journaled and saved for that particular collaboration session.

A plurality of global-key-value pairs journaled within product description data may be initiated when a customization session for customizing an interactive digital design is initiated. The plurality of global-key-value pairs may be updated each time when, for example, a contributor, who has been granted a valid license and who participates in the customization session, provides modifications to the interactive digital design. The plurality of global-key-value pairs may carry license agreement information and restriction information specific to the customization session and the interactive digital design.

Examples of global-key-value pairs for an interactive digital design may include: an age restriction key-value that includes an age restriction key and an age value; a content lock key-value that includes a content lock key and a content lock key value; a blacklist key-value that includes a blacklist key and a blacklist; a whitelist key-value that includes a whitelist key and a whitelist; an ownership key-value that includes an ownership key and a user universally unique identifier (user ID); a copyright key-value that includes a copyright key and a user ID; a license key-value that includes a license key and a universally unique identifier for a specific license agreement held between an owner or a primary designer and a computer collaboration server; a customer support key-value that includes a support key and a support agent contract identifier; and an attribution key-value that includes an attribution key and a universally unique identifier that references a set of software instructions for manufacturing to apply a marking on a product as may be directed by copyright or licensing agreements.

Based on the plurality of global-key-value pairs for the interactive digital design, an ownership-attribution tree for the interactive digital design is constructed. An ownership-attribution tree may be represented as a graph that captures the relationships between the contributors participating in creating the interactive design, the contributors' roles, the contributors' licenses, the contributors' ownership rights, and other information pertaining to contracts and agreements between the contributors.

Based on the ownership-attribution tree and the key-value pairs for the interactive digital design, manufacturing instructions for manufacturing the digital or physical product corresponding to the interactive digital design are generated. The ownership key-value may affect the creation of the product, causing ownership, copyright, or attribution text to be placed in a particular fashion. A digital product is a product that may be delivered and represented digitally, while a physical product is a physical thing corresponding to the interactive design. The manufacturing instructions may be transmitted to a manufacturing entity to cause the manufacturing entity to use the manufacturing instructions to manufacture the customized digital or physical product.

In some embodiments, the product description data for the interactive digital design is modified as one or more modifications to the interactive digital design are received from user interfaces implemented by the computers used by users to update the interactive digital design. Upon detecting that no further modifications for the interactive digital design are provided, the plurality of global-key-value pairs journaled within the product description data is stored in a global-key-values database.

5.2. Example of a Role-Based Collaboration Platform

In some embodiments, the approach for generating and using tokens to request services and access to a product collaboration platform may be implemented in one or more computer systems that host the product collaboration platform. Alternatively, the approach may be implemented in one or more computer systems that communicate with the collaboration platform but that do not actually host the platform itself. Therefore, to explain the computer environment supporting the approach presented herein, an example configuration of the product collaboration platform is explained.

5.3. User Roles

A role assigned to a user is a function assumed or played by the user who participates in a collaboration session established to create an interactive design. Various roles may be assigned to users who interact with computer collaboration system 100 via user computers 140A-140G. Examples of roles may include a customer role, a customer support agent role, a graphics designer role, a customer peer role, and a customer product artist role. Based on the assigned roles, the users may be granted access to a product description of an interactive digital design as editors, viewers, managers, and the like.

A customer role may be assigned to a user who is a customer and who wants to customize one or more interactive digital designs offered by platform 10. A customer may, for example, edit/modify attributes of an interactive object, view a rendering of the customized design, publish the customized design, request that another user (a designer or a customer support agent) modify the interactive digital design according to the users' description, request a list of modifications that the user proposed for the interactive digital design, and/or delete or revert some of the modifications included in the list.

A customer support agent role may be assigned to a user who may assist other users in customizing an interactive digital design. A customer support agent may, for example, help in modifying the interactive digital design, provide various views of the rendered design, publish the rendered design on behalf of the user, and the like.

A graphics designer role may be assigned to a user who may assist in defining attributes for an interactive digital design, defining default values for the attributes for the design, defining ranges of the values for the attributes for the design, and/or customizing the interactive digital design. For example, a graphics designer may define a set of attribute-default values pair and store the pairs in product data definitions 104. A graphics designer may also define a set of roles that may be assigned to the users and store the set of roles in user profiles 102.

A customer peer role may be assigned to a user who may view an interactive digital design customized by someone else. A customer peer may, for example, view the interactive digital design (as a customer is customizing the design) and provide comments or feedback on the design to the customer. A customer peer may be granted access to a product description for the customized design, and in some embodiments, may modify the attributes associated with the design.

A customer product artist role may be assigned to a user who may provide tutorials and online help in customizing interactive digital designs. A customer product artist may define attributes for the designs, determine default values for the attributes, determine ranges of values for the attributes, determine the roles for the user who may be allowed to customize the interactive digital designs, and/or demonstrate how to use the customization functionalities. Details of user roles and interactions between the user are described later in reference to FIG. 3B.

Figure 8:
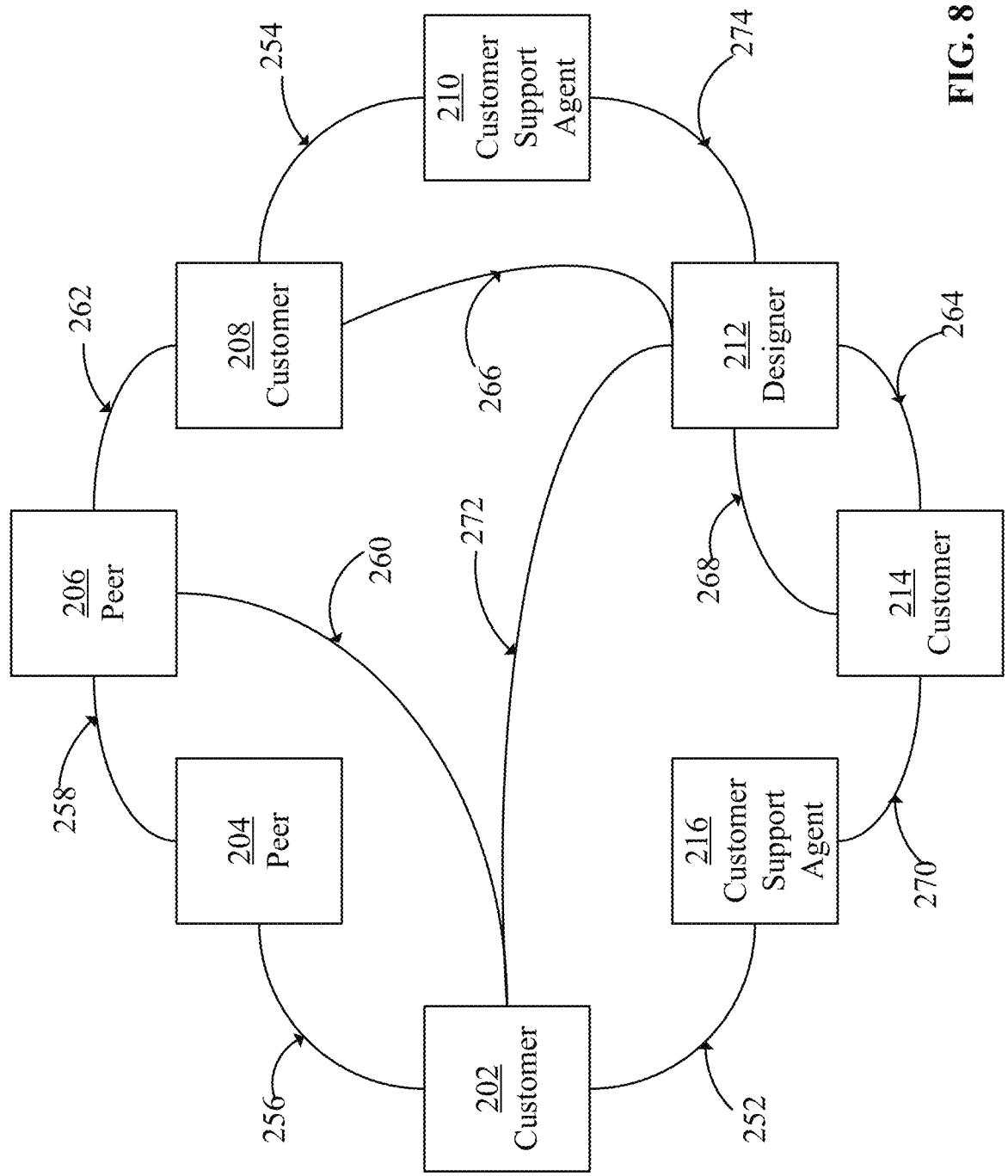
FIG. 8 is a block diagram showing examples of roles in a product collaboration platform.

FIG. 8 is a block diagram showing examples of roles in a product collaboration platform. In FIG. 8, examples of customer-agent collaboration sessions include a session 252 between a customer 202 and a customer support agent 216, a session 254 between a customer 208 and a customer support agent 210, a session 264 between a customer 214 and a designer 212, a session 266 between customer 208 and designer 212, a session 268 between a customer 214 and a designer 212, a session 270 between a customer 214 and customer support agent 216, and a session 272 between customer 202 and designer 212.

In some embodiment, a customer may use email, text, phone, and any other type of communications to describe to a customer support agent the design that the customer would like to achieve. Once the customer explains to the agent the desired design, the customer may select, from his user interface, a user interface element that would allow setting an editor role to the agent so that the agent could edit the interactive digital design for the customer. This would include granting the agent access to a product description associated with an interactive digital design as an editor.

In response to that, the agent may be provided with an updated user interface or a new user interface that would allow the agent to modify the interactive digital design. For example, the agent could select, from his user interface, a location-based attribute (or a group of attributes) and modify a value associated with the attribute, select another attribute and modify it, and so forth. Each modification may be automatically saved as a serialized key-value pair, and this solves the technical problem of navigating through countless sets of attributes and dealing with, for example, countless clicks to complete the customization as required in conventional customization platforms. The pairs may be transmitted to a product options framework, which would update the product description for the interactive digital design. Then, a product options framework may render a modified depiction of the interactive digital design and propagate the rendering to the user computers for rendering in the corresponding user interfaces.

5.4. Collaboration Data

Referring to FIG. 2, computer collaboration system 100 may include one or more databases 102-105 used to store information used to facilitate, conduct, and save collaboration sessions. The types of the databases included in collaboration system 100 may vary and may depend on the implementation of platform 10. In the example depicted in FIG. 2, databases 102-105 include storage components configured to store, for example, attribution information, license information, restriction information, user profiles, global-key-values and other data used to track attributions of the contributors participating in customization sessions, as well as product definitions and other data used to generate a plurality of representations of customized products.

5.5. Product Options Framework

Referring again to FIG. 2, product options framework 110 comprises a plurality of modules and applications which, when executed by one or more processors 120, cause the processors to implement the method for role-based and attribution-tracking collaborative design of custom products. Product options framework 110 may be configured to communicate with an attribution framework 129, a rendering framework 130, an accessories framework 132, a bundling framework 134, and a defaulting framework 136.

Attribution framework 129 may be configured to, for example, generate an attribution tree based on global-key-values collected during a customization session. Attribution framework 129 may also be configured to use the attribution tree to determine and verify corresponding licenses and copyright privileges for users/collaborators who participated in the customization session. Furthermore, attribution framework 129 may be configured to track the contributions of the collaborators and to derive the manufacturing instructions from the global-key-values collected during the session.

Product options framework 110 may be configured to receive inputs from rendering framework 130 to generate a rendering of an interactive digital design based on, at least in part, a current representation stored in collaboration components 106. Product options framework 110 may be also configured to receive inputs from accessories framework 132 to determine one or more accessories for an interactive digital design, and to include the determined accessories in the customization of the product.

Furthermore, product options framework 110 may be configured to receive inputs from building framework 134 to determine constraints for customizing an interactive digital design. This may include determining one or more attributes that are associated with the design and that can be customized by users. This may also include assigning default values to the determined attributes, determining ranges of values for the attributes, and/or determining sets of values that may be assigned to the attributes.

Product options framework 110 may be also configured to receive inputs from defaulting framework 116 to determine a default design for an interactive digital design, determine default roles that may be assigned to the user, and determine initial values for various parameters and attributes associated with the designs and collaboration sessions.

5.6. Attribute Engines

Attribute engine 108 may be configured to facilitate role-based collaboration of customizable products according to roles assigned to users and according to manufacturing constraints set forth for the products.

Attribute engine 108 may be configured to, for example, interact with collaboration components 106, product options framework 110, frameworks 130-136 and user computers 140A-140D to allow the users using devices 140A-140D to collaborate in customizing interactive digital designs offered by platform 10.

In some embodiments, attribute engine 108 may be configured to interact directly with users of user computers 140A-140D. In other embodiments, attribute engine 108 may be configured to interact with users of user computers 140A-140D via a computer network 130, as shown in FIG. 3.

Computer network 130 may be implemented as any type of communications network, including a local area network (LAN), wide area network (WAN), a wireless network, a secure virtual LAN (vLAN), a secure virtual WAN (vWAN), and the like.

5.7. User Computers

User computers 140A-140G may include any type of communications devices configured to facilitate communications between users and computer collaboration system 100. In the example depicted in FIG. 3, a user computer 140A is a laptop, a user computer 140B is a personal computer, a user computer 140C is a personal assistant device, a user computer 140D is a mobile device such as a smartphone, a user computer 140E is a video camera, a user computer 140F is a digital camera, and a user computer 140G is a microphone configured to capture audio data and communicate the audio data to computer collaboration system 100.

The types and counts of user computers 140A-140G are not limited to the examples shown in FIG. 3. For example, even though FIG. 3 depicts only one laptop 140A, one personal computer 140B, one personal assistant 140C, one smartphone 140D, one video camera 140E, one digital camera 140F, and one microphone 140G, platform 1 may include a plurality of laptops 140A, a plurality of personal computers 140B, a plurality of personal assistants 140C, a plurality of smartphones 140D, a plurality of video cameras 140E, a plurality of digital cameras 140F, and a plurality of microphones 140G. In other examples, user computers may include fewer devices than those depicted in FIG. 3. In yet other examples, the user computers may include devices that are not depicted in FIG. 3.

5.8. Collaboration Server

Collaboration server 155 may be implemented in software, hardware, or both, and may be configured to cooperate with monitoring system 156 to provide monitoring capabilities to operators of the platform and/or a third-party monitoring service. The capabilities may include the ability to intercept contents of communications exchanged between the users of the collaboration platform, determine whether the communications meet the terms of the collaboration agreements, and pursue actions to address violations when the communications fail to meet the rules set forth in the agreements.

Collaboration server 155 may be part of computer collaboration system 100, as shown in FIG. 2. Alternatively, a collaboration server may be a system implemented in a computer server (not shown) that is separate from computer collaboration system 100.

In some embodiments, collaboration server 155 may comprise request analyzer 159, as shown in FIG. 2. In other embodiments, collaboration server 155 may be separate from request analyzer 159.

In some embodiments, collaboration system 155 may receive a request for ordering, for example, a physical product corresponding to an interactive digital design. Collaboration system 155 may collaborate with code embedder 158 to generate a token (or to retrieve the already generated token) that represents a plurality of key-value pairs for the interactive design. The token may contain digital data that encodes a UUID of a plurality of key-value pairs for the interactive design. In some embodiments, the plurality of key-value pairs may be saved in a separate file, and a hyperlink to the file may be stored and referred to by the token, by the hyperlink's identifier, or by a URL.

Collaboration system 155, product option framework 110, attribute engine 108, request analyzer 159 and code embedder 158 may cooperate with each other to generate a digital representation of the interactive design and to embed the token in the digital representation. Code embedder 158 may embed the token indicating the set of the key-value pairs into the digital representation of the interactive design.

In some embodiments, collaboration server 155 is configured to transform ownership and license agreements, embedded in a plurality of key-value pairs journaled during a collaboration session between collaborators, into a graph-network and then into an ownership-agreement tree. The ownership-agreement tree may be used to represent the ownership and license agreements between the collaborators participating in the collaboration session.

Collaboration server 155 may be also configured to evaluate the ownership-agreement tree with respect to a plurality of role-based communications channels, established between the collaborators, for each constraint of a plurality of constraints on each collaborator of the collaborators.

The constraints may be identified from the ownership-agreement tree, and may include rules, guidance, conditions, specifications, and provisions that set forth the manner in which collaborators may communicate with each other during collaboration sessions. Examples of constraints may include agreement constraints (such as ownership agreements, license agreements, and the like), use constraints (that impose limits on editing and modifying design elements produced by collaborators), communications constraints (that impose limits to durations of the sessions, inactivity during the sessions, and the like), interactions constraints (such as contractual constraints and professional-conduct constraints), and content constraints (imposing blacklists and whitelists on the communications). Some of the constraints may be system-wide constraints and apply to one or more, or all, collaborations supported by a collaboration platform.

In some embodiments, collaboration server 155 may be configured to determine whether one or more communications, exchanged by the collaborators via the plurality of role-based communications channels, violate one or more constraints of the plurality of constraints.

In response to determining that some communications violate the constraints, collaboration server 155 may determine one or more triggers corresponding to violations, and based on the triggers, determine one or more actions to be performed to address the violations. Subsequently, collaboration server 155 may send the actions, or the identifiers of the actions, to, for example, monitoring system 156 to cause the monitoring system to execute the actions to address the violations.

To enable the above described process, collaboration server 155 cooperates with monitoring system 156 also with respect to handling the receiving live-requests issued by users to initiate collaboration sessions with other users, designers, support engineers, and the like.

Furthermore, collaboration server 155 may be configured to monitor requests issued by the users who request assistance from designers and/or support engineers, and to monitor live video-based sessions, live-audio sessions, and/or live chats established in response to the requests. To monitor the sessions and chats, collaboration server 155 may use monitoring system 156, agreement processor 152, and/or communications processor 153 to intercept the communications included in the sessions, generate transcripts of the sessions, and the like.

In some embodiments, a transcript includes video frames, audio clips and chat texts. The transcripts may be used for training purposes, and to monitor the communications exchanged between the users, customers, designers, support engineers and others who participate in the collaboration sessions supported by the collaboration platform.

In some embodiments, upon receiving a transcript, collaboration server 155 uses monitoring system 156 and/or processor 120 to determine, based on the transcript, individual communications of the corresponding data streams and use, for example, monitoring system 156 to determine whether the communications indicate violations. This may be determined by referring to, for example, blacklist database 163, which may include a blacklist of words and phrases determined to be inappropriate, unprofessional and/or undesirable.

Blacklist database 163 may also include a whitelist of words and phrases that collaborators may use when communicating with each other.

Upon receiving an indication that some communications trigger a violation of the terms of agreement between the collaborators, collaboration server 155 may use monitoring system 156 to determine actions to address the violation.

In some embodiments, an action may be determined using contents of actions database 162 or any other database configured to provide a mapping between violation triggers and the actions.

Action database 162 may be a database implemented separately from blacklist database 163, as shown in FIG. 3. Alternatively, an action database may be combined with blacklist database 163, and both databases may implement a mapping from the characteristics indicating violations to the actions.

Generally, the actions may include removing the collaborator(s), terminating the session(s), generating, and sending notifications to the corresponding users, generating, and sending notifications to the management managing the designers and support engineers, and the like. If communications include inappropriate words/language exchanged during a corresponding communications session, then the actions may include, for example, terminating the communications session, removing a collaborator, sending a warning message to the corresponding collaborator, and the like. On the other hand, if communications indicate a long time of inactivity during the communications session, the actions may include aborting the session, notifying the system administrator about the no-show, notifying the users that the session has been aborted, and the like.

6. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
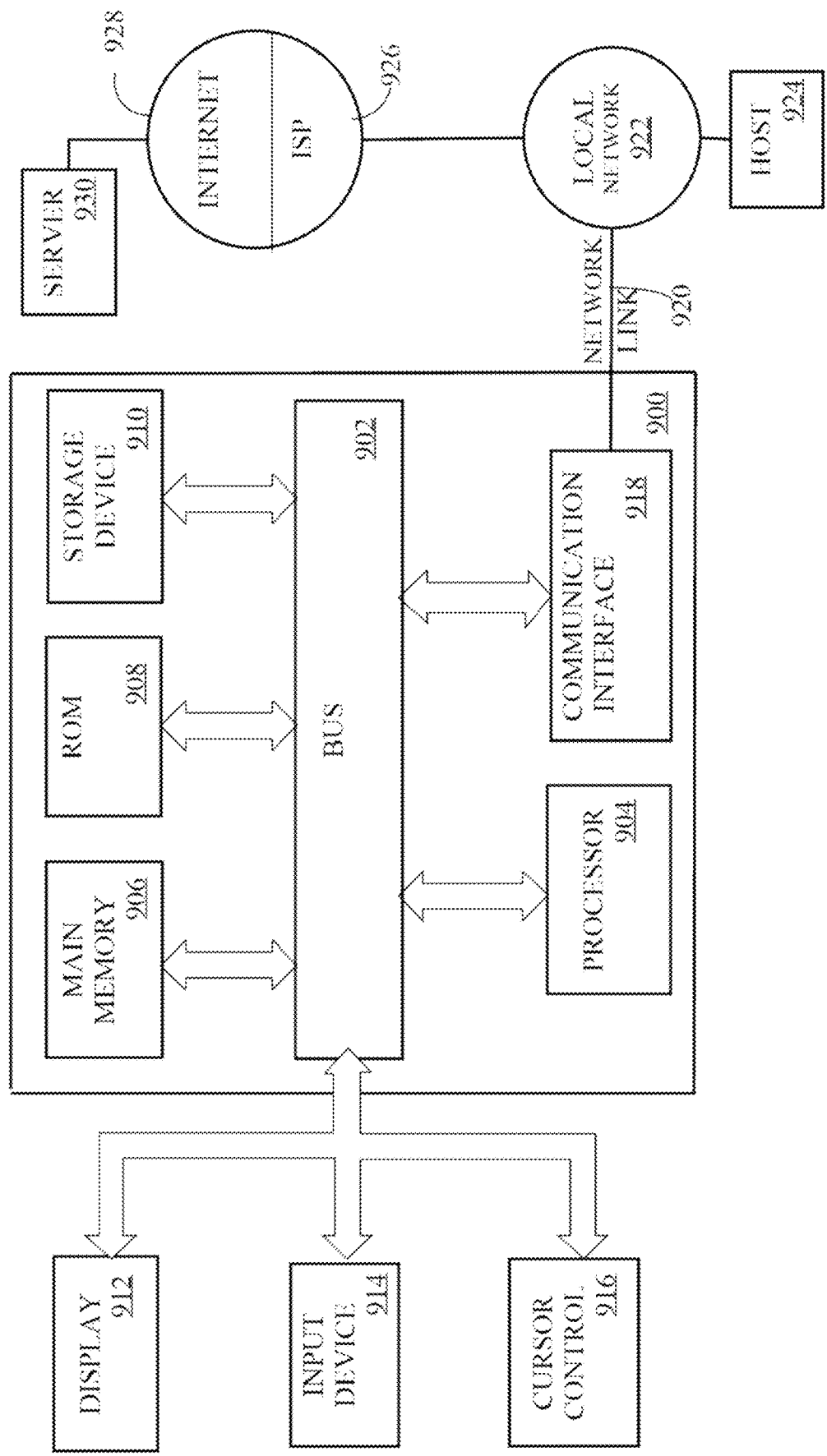
FIG. 9 is a block diagram of a computer system on which embodiments of the approach may be implemented.

FIG. 9 is a block diagram that depicts an example computer system 900 upon which embodiments may be implemented. Computer system 900 includes a bus 902 or other communication mechanism for communicating information, and a processor 904 coupled with bus 902 for processing information. Computer system 900 also includes a main memory 906, such as a random-access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. Although bus 902 is illustrated as a single bus, bus 902 may comprise one or more buses. For example, bus 902 may include without limitation a control bus by which processor 904 controls other devices within computer system 900, an address bus by which processor 904 specifies memory locations of instructions for execution, or any other type of bus for transferring data or signals between components of computer system 900.

An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input-device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic or computer software which, in combination with the computer system, causes or programs computer system 900 to be a special-purpose machine. According to one embodiment, those techniques are performed by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 900, various computer-readable media are involved, for example, in providing instructions to processor 904 for execution. Such a medium may take many forms, including but not limited to, non-volatile media and volatile media. Non-volatile media includes, for example, optical or magnetic disks, such as storage device 910. Volatile media includes dynamic memory, such as main memory 906. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated service digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world-wide packet data communication network now commonly referred to as the "Internet" 928. Local network 922 and Internet 928 both use electrical, electromagnetic, or optical signals that carry digital data streams.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   receiving, by a service computer, a request, from a user computer, for a service with regard to a product;
   wherein the request comprises information obtained by scanning, by the user computer, a token shown on the product;
   wherein the token is generated based on, at least in part, a digital token that is created during a process of generating a digital design of the product and that indicates a location, at a data storage system, at which a plurality of key-value pairs for the digital design is stored;
   wherein the token is embedded into product description data associated with the digital design;
   translating the token to a hyperlink in a standard format that a plurality of service computers understands;
   storing the hyperlink in the standard format;
   wherein the request for the service comprises the hyperlink associated with the service and an indication of the product to which the service pertains;
   causing the user computer to perform:
      determine whether the hyperlink indicates a domain name,
      in response to determining that the hyperlink indicates a domain name:
         display, on the user computer, a first graphical representation of a first website associated with the domain name,
         establish a first communications connection between the user computer and the first website,
         display, on the user computer, a first graphical user interface generated based on first data received from the first website and via the first communications connection, and allowing a user to select the service,
         receive a service selection via the first graphical user interface;
         transmit the service selection and the indication of the product from the user computer to the service computer;
      determine whether the hyperlink indicates a social community name,
      in response to determining that the hyperlink indicates a social community name:
         display, on the user computer, a second graphical representation of a second website associated with the social community name,
         establish a second communications connection between the user computer and the second website corresponding to the domain name,
         display, on the user computer, a graphical user interface generated based on data received from the second website and via the second communications connection, and allowing a user to select the service,
         transmit the service selection and the indication of the product from the user computer to the service computer;
   in response to receiving, by the service computer, the service selection for the service:
      determining one or more customization options for the service;
      causing, by the service computer, displaying, on the user computer, a graphical user interface allowing selecting any of the one or more customization options;
   in response to receiving, from the user computer, input for at least one of the one or more customization options for the service:
      automatically generating adjusted input by adjusting the input for the at least one of the one or more customization options based on one or more manufacturing constraints;
      transmitting, in real time, the adjusted input and the hyperlink associated with the service to either the first website or the second website to perform the service for the at least one of the one or more customization options; and providing, by the service computer, the service performed by either the first website or the second website according to the adjusted input provided for the at least one of the one or more customization options;

in response to receiving a request for the product corresponding to the digital design, transmitting the product description data with the token embedded in the product description data to a manufacturing entity to cause the manufacturing entity to:
extract the digital token from the product description data,
use the digital token to retrieve the plurality of key-value pairs from the location,
use the plurality of key-value pairs to generate manufacturing instructions for manufacturing the product corresponding to the digital design,
generate the token, and
affix the token to the product.

2. The computer-implemented method of claim 1, wherein the product on which the token is shown is a digital product displayed on a display device of the user computer;
wherein the token is a digital code;
wherein the digital code encodes the hyperlink and the indication of the digital product.

3. The computer-implemented method of claim 1, wherein the product on which the token is shown is a physical product;
wherein the token is a physical code;
wherein the physical code encodes the hyperlink and the indication of the physical product.

4. The computer-implemented method of claim 1, wherein the token is a quick response (QR) code;
wherein the QR code is scanned using a digital scanning device to generate scanned data;
wherein the scanned data are provided to the user computer.

5. The computer-implemented method of claim 1,
wherein the plurality of key-value pairs for the digital design captures one or more characteristics of the digital design and captures one or more attributions of users who collaborated in creating the digital design of the product.

6. The computer-implemented method of claim 5, wherein the digital token is represented as a universally unique identifier (UUID) uniquely identifying the digital token;
wherein the UUID is embedded in the product description data as a watermark;
wherein the UUID is embedded in the product description data in a frequency domain data of the product description data.

7. The computer-implemented method of claim 5, wherein the digital token is used to generate a 3D model of the digital design.

8. The computer-implemented method of claim 1, wherein providing, by the service computer, the service according to the at least one of the one or more customization options comprises generating a thank-you note and sending the thank-you note according to the at least one of the one or more customization options.

9. The computer-implemented method of claim 1, wherein providing, by the service computer, the service according to the at least one of the one or more customization options comprises facilitating access to a social media account according to the at least one of the one or more customization options.

10. One or more non-transitory computer readable storage media storing one or more instructions which, when executed by one or more processors, cause the one or more processors to perform:
receiving, by a service computer, a request, from a user computer, for a service with regard to a product;
wherein the request comprises information obtained by scanning, by the user computer, a token shown on the product;
wherein the token is generated based on, at least in part, a digital token that is created during a process of generating a digital design of the product and that indicates a location, at a data storage system, at which a plurality of key-value pairs for the digital design is stored;
wherein the token is embedded into product description data associated with the digital design;
translating the token to a hyperlink in a standard format that a plurality of service computers understands;
storing the hyperlink in the standard format;
wherein the request for the service comprises the hyperlink associated with the service and an indication of the product to which the service pertains;
causing the user computer to perform:
determine whether the hyperlink indicates a domain name,
in response to determining that the hyperlink indicates a domain name:
display, on the user computer, a first graphical representation of a first website associated with the domain name,
establish a first communications connection between the user computer and the first website,
display, on the user computer, a first graphical user interface generated based on first data received from the first website and via the first communications connection, and allowing a user to select the service,
receive a service selection via the first graphical user interface;
transmit the service selection and the indication of the product from the user computer to the service computer;
determine whether the hyperlink indicates a social community name,
in response to determining that the hyperlink indicates a social community name:
display, on the user computer, a second graphical representation of a second website associated with the social community name,
establish a second communications connection between the user computer and the second website corresponding to the domain name,
display, on the user computer, a graphical user interface generated based on data received from the second website and via the second communications connection, and allowing a user to select the service,
transmit the service selection and the indication of the product from the user computer to the service computer;
in response to receiving, by the service computer, the request service selection for the service:

determining one or more customization options for the service;

causing, by the service computer, displaying, on the user computer, a graphical user interface allowing selecting any of the one or more customization options;

in response to receiving, from the user computer, input for at least one of the one or more customization options for the service:

automatically generating adjusted input by adjusting the input for the at least one of the one or more customization options based on one or more manufacturing constraints;

transmitting, in real time, the adjusted input and the hyperlink associated with the service to the plurality of service computers to perform the service for the at least one of the one or more customization options; and providing, by the service computer, the service performed by either the first website or the second website according to the adjusted input provided for the at least one of the one or more customization options;

in response to receiving a request for the product corresponding to the digital design, transmitting the product description data with the token embedded in the product description data to a manufacturing entity to cause the manufacturing entity to:

extract the digital token from the product description data, use the digital token to retrieve the plurality of key-value pairs from the location, use the plurality of key-value pairs to generate manufacturing instructions for manufacturing the product corresponding to the digital design, generate the token, and affix the token to the product.

11. The one or more non-transitory computer readable storage media of claim 10, wherein the product on which the token is shown is a digital product displayed on a display device of the user computer;

wherein the token is a digital code;

wherein the digital code encodes the hyperlink and the indication of the digital product.

12. The one or more non-transitory computer readable storage media of claim 10, wherein the product on which the token is shown is a physical product;

wherein the token is a physical code;

wherein the physical code encodes the hyperlink and the indication of the physical product.

13. The one or more non-transitory computer readable storage media of claim 10, wherein the token is a quick response (QR) code;

wherein the QR code is scanned using a digital scanning device to generate scanned data;

wherein the scanned data are provided to the user computer.

14. The one or more non-transitory computer readable storage media of claim 10, wherein the plurality of key-value pairs for the digital design captures one or more characteristics of the digital design and captures one or more attributions of users who collaborated in creating the digital design of the product.

15. The one or more non-transitory computer readable storage media of claim 14, wherein the digital token is represented as a universally unique identifier (UUID) uniquely identifying the digital token;

wherein the UUID is embedded in the product description data as a watermark;

wherein the UUID is embedded in the product description data in a frequency domain data of the product description data.

16. The one or more non-transitory computer readable storage media of claim 14, wherein the digital token is used to generate a 3D model of the digital design.

17. The one or more non-transitory computer readable storage media of claim 10, wherein providing, by the service computer, the service according to the at least one of the one or more customization options comprises generating a thank-you note and sending the thank-you note according to the at least one of the one or more customization options.

18. The one or more non-transitory computer readable storage media of claim 10, wherein providing, by the service computer, the service according to the at least one of the one or more customization options comprises facilitating access to a social media account according to the at least one of the one or more customization options.

\* \* \* \* \*